United States Patent
Ohmi et al.

(10) Patent No.: US 8,020,574 B2
(45) Date of Patent: Sep. 20, 2011

(54) METHOD FOR CLOSING FLUID PASSAGE, AND WATER HAMMERLESS VALVE DEVICE AND WATER HAMMERLESS CLOSING DEVICE USED IN THE METHOD

(75) Inventors: Tadahiro Ohmi, Sendai (JP); Nobukazu Ikeda, Osaka (JP); Kouji Nishino, Osaka (JP); Masaaki Nagase, Osaka (JP); Kyousuke Dohi, Osaka (JP); Ryutaro Nishimura, Osaka (JP)

(73) Assignees: Tadahiro Ohmi, Miyagi (JP); Fujikin Incorporated, Osaka (JP)

( * ) Notice: Subject to any disclaimer, the term of this patent is extended or adjusted under 35 U.S.C. 154(b) by 0 days.

(21) Appl. No.: 11/762,987

(22) Filed: Jun. 14, 2007

(65) Prior Publication Data

US 2008/0035877 A1    Feb. 14, 2008

Related U.S. Application Data

(60) Division of application No. 11/425,028, filed on Jun. 19, 2006, now Pat. No. 7,278,437, which is a continuation of application No. 11/152,638, filed on Jun. 15, 2005, now Pat. No. 7,080,658, which is a continuation of application No. PCT/JP03/16287, filed on Dec. 18, 2003.

(30) Foreign Application Priority Data

Dec. 19, 2002  (JP) ................................ 2002-367420

(51) Int. Cl.
*F17D 1/20*        (2006.01)
(52) U.S. Cl. ....... 137/12; 137/14; 137/487.5; 137/624.2
(58) Field of Classification Search .............. 137/487.5, 137/2, 12, 14, 624.11, 624.18, 624.2; 251/129.04
See application file for complete search history.

(56) References Cited

U.S. PATENT DOCUMENTS 5,409,037 A    4/1995    Wheeler et al.
(Continued)

FOREIGN PATENT DOCUMENTS

EP    0 877 310 A1    11/1998
(Continued)

OTHER PUBLICATIONS

Waterhammer, "A Complex Phenomenon with a Simple Solution", online search at Omega.com, Technical Reference Selection Guide.
(Continued)

*Primary Examiner* — Stephen M Hepperle
*Assistant Examiner* — William McCalister
(74) *Attorney, Agent, or Firm* — Griffin & Szipl, P.C.

(57) ABSTRACT

A fluid passage is emergently-closed in a short time without causing a water hammer by an extremely simple device and operation. A water hammerless closing device includes an actuator operated valve provided in a fluid passage, an electro-pneumatic conversion device for supplying a 2-step actuator operating pressure Pa to an actuator operated-type valve, a vibration sensor removably secured to the pipe passage on the upstream side of the actuator operated-type valve, and a tuning box receiving a vibration detection signal Pr from the vibration sensor and delivering a control signal Sc to the electro-pneumatic conversion device for controlling the step operating pressure Ps' of the 2-step actuator operating pressure Pa so that, with the control signal Sc being regulated, the electro-pneumatic conversion device outputs the 2-step actuator operating pressure Pa with the step operating pressure Ps' capable of bringing the vibration detection signal Pr substantially to zero.

21 Claims, 26 Drawing Sheets

U.S. PATENT DOCUMENTS

| | | | |
|---|---|---|---|
| 5,732,929 A | | 3/1998 | Luppino et al. |
| 5,941,500 A | * | 8/1999 | Lebkuchner .................... 251/77 |
| 5,970,430 A | * | 10/1999 | Burns et al. .................... 702/122 |
| 6,102,072 A | | 8/2000 | Yokota et al. |
| 6,178,997 B1 | | 1/2001 | Adams et al. |
| 6,192,321 B1 | * | 2/2001 | Grumstrup et al. ............ 702/113 |
| 6,745,997 B2 | * | 6/2004 | Moeller et al. ............ 251/129.04 |
| 6,889,706 B2 | | 5/2005 | Fukano et al. |
| 7,080,658 B2 | | 7/2006 | Ohmi et al. |
| 7,278,437 B2 | | 10/2007 | Ohmi et al. |
| 7,448,361 B1 | | 11/2008 | Pursifull et al. |
| 2002/0011762 A1 | * | 1/2002 | Klenk et al. ............. 310/316.03 |
| 2008/0257415 A1 | * | 10/2008 | Ohmi et al. .................... 137/14 |

FOREIGN PATENT DOCUMENTS

| | | |
|---|---|---|
| JP | 50-2075 B1 | 1/1975 |
| JP | 55-119923 U | 8/1980 |
| JP | 59-45378 U | 3/1984 |
| JP | 60-8388 B2 | 3/1985 |
| JP | 60-208677 A | 10/1985 |
| JP | 62113976 A | 5/1987 |
| JP | 63-115208 A | 5/1988 |
| JP | 1-190235 | 7/1989 |
| JP | 11-82763 A2 | 3/1993 |
| JP | 7-190235 A | 7/1995 |
| JP | 9-502292 A | 3/1997 |
| JP | 2547366 | 9/1997 |
| JP | 11-118049 | 4/1999 |
| JP | 2000-10602 A | 1/2000 |
| JP | 2000-074254 A | 3/2000 |
| JP | 2002-295705 A | 10/2002 |
| JP | 2004-213638 A | 7/2004 |
| JP | 2004-316679 A | 11/2004 |

OTHER PUBLICATIONS

International Search Report (PCT/JP03/16287), completed Mar. 2, 2004.

Office Action issued in co-pending U.S. Appl. No. 10/597,343, dated Feb. 12, 2010.

Z. Michael Lahlou, "Water Hammer" Tech Brief, 2003, pp. 1-4, Exhibit A.

B. Formisano, "Fixing Water Hammer," About.Com Home Repair, at http://homerepair.about.com/od/plumbingrepair/ss/pipe_noises_2. htm, downloaded Aug. 14, 2009, pp. 1-2, Exhibit B.

Water Hammer Calculation, at http://lmnoeng.com/WaterHammer/WaterHammer.htm, downloaded Aug. 14, 2009, pp. 1-9, Exhibit C.

Definition of the term "water hammer" at Dictionary.com, Exhibit D.

Snapshot of a webpage at http://cr4.globalspec.com/thread/4797/Water-Hammer-in-a-Fuel-Line, downloaded Jun. 10, 2010. Exhibit E.

Snapshot of a webpage at http://www.eng-tips.com/viewthread.cfm?qid=72041&page=88, downloaded Jun. 10, 2010, Exhibit F.

Dictionary of Physics and Chemistry, Rikagaku Jiten, published on Jul. 5, 1988.

Office Action issued in co-pending U.S. Appl. No. 12/422,136, dated Feb. 17, 2011.

* cited by examiner (a)

(b)

Tank pre. 0kgf/cm²
Valve 6.35mm

A stroke goes down when a tank pressure is lowered

Occurrence of Water hammer

Tank Pressure: 3kgf/cm$^2$G

Air Pre. Valve Actuator Pre.

METHOD FOR CLOSING FLUID PASSAGE, AND WATER HAMMERLESS VALVE DEVICE AND WATER HAMMERLESS CLOSING DEVICE USED IN THE METHOD

This application is a divisional of U.S. patent application Ser. No. 11/425,028, (now U.S. Pat. No. 7,278,437), filed Jun. 19, 2006, which is a continuation of U.S. patent application Ser. No. 11/152,638 (now U.S. Pat. No. 7,080,658), filed Jun. 15, 2005, which is a Continuation of International Patent Application No. PCT/JP2003/016287 filed Dec. 18, 2003, which claims priority on Japanese Patent Application No. 2002-367420, filed Dec. 19, 2002. The entire disclosures of the above patent applications are hereby incorporated by reference.

FIELD OF THE INVENTION

The present invention is concerned with improvements in a water hammer prevention system in which the water-hammer effect is completely prevented when urgently or promptly closing a fluid passage. The present invention is particularly concerned with a method for closing the fluid passage that is capable of urgently or promptly closing the water passage without causing the occurrence of the water hammer effect irrespective of the fluid pressure involved. The present invention is also concerned with a water hammerless valve device, and a water hammerless closing device, used in the method for closing the fluid passage.

BACKGROUND OF THE INVENTION

It is well known that when a passage in which a fluid, such as water or the like, passes through is abruptly closed, there occurs the so-called "water hammer." The "water hammer" is a pressure effect manifested by the fluid in the passage under these conditions in which the pressure inside the passage vibratingly rises upstream of the place or point where the passage is closed abruptly.

When a water hammer is created, various problems, such as breakdown of devices or instruments connected to the fluid passage, are caused by the vibrating rise of the internal pressure in the upstream side passage.

Therefore, various techniques have been developed to prevent water hammer. However, these techniques basically address the water hammer effect by (1) making the time for closing the fluid passage long (i.e., so closing of the fluid passage is not so abrupt), or (2) by having the vibrating pressure generated inside the passage released to the outside by opening a bypass passage, or (3) by absorbing the water hammer using a separately installed accumulator. The method by which the time for closing the passage is lengthened is undesirably time-consuming with the result that this method can not be applied to situations where there is the need of urgent (or rapid) closing of the fluid passage. On the other hand, the other two methods for avoiding the water hammer necessarily involve attachments to the fluid passage, which adds cost to building a system and to practicing a method for closing a fluid passage without generating a water hammer. The added costs for these attachments is too high.

The water hammer related problems discussed above have arisen previously in industrial fields where the fluid flowing in the passage involved a relatively great flow rate. In recent years, however, avoiding the water hammer effect has become desirable even in fields where the fluid moves with a small flow rate. For example, in the fields of wet type oxide film treatment of silicon in the semiconductor manufacturing industry, or wafer cleaning apparatus development, or the development of chemical liquid supply systems and in the field of medicine production, prevention of water hammer generation during urgent (or prompt) closure of the fluid supply passage has been strongly required in order to maintain the facilities of production, upgrade the product quality, and reduce the opening/closing time of valves in accordance with increased frequency of valve opening/closing.

Examples of prior art devices and methods employed for addressing the problem of the generation of a water hammer include: (a) Patent Document 1. Toku-Kai-Hei No. 7-190235, which describes a valve control device; (b) Patent Document 2 Toku-Kai No. 2000-10602, which describes a PID control method and its controller; and (c) Patent Document 3 Toku-Kai No. 2002-295705, which describes a motor-operated valve for preventing water hammer, and its controlling method.

Object of the Invention

It is an object of the present invention to provide a method for closing a fluid passage, and a water hammerless valve device and a hammerless closing device used in the method which can solve the afore-mentioned problems of the conventional water hammer prevention techniques. In other words, it is an object of the present invention to avoid the disadvantages of the prior art methods, which are (1) methods in which the time for closing the fluid passage is relatively long and can not fully cope with the needs for urgent or prompt closure of the fluid passage, and (2) methods which seek to absorb, or release, the vibrating pressure of the water hammer by the installation of expensive attachments.

It is also an object of the present invention to provide a method for closing a fluid passage, and a water hammerless valve device and a hammerless closing device used in the method for closing the fluid passage that can urgently (or promptly) close the fluid passage in an extremely short period of time (for example, less than 1000 m sec), without causing the water hammer effect, by closing a valve installed in the fluid passage in a multi-step operation.

It is also an object of the present invention to provide a method for closing a fluid passage, and a water hammerless valve device and a water hammerless closing device used in the method for closing a fluid passage that can promptly and surely close the fluid passage without causing the water hammer. wherein the conditions for closing the valve without causing the water hammer are determined in advance by actually conducting valve closing tests so that the actuator of the valve body is operated by an electro-pneumatic conversion device storing the above mentioned valve-closing conditions.

BRIEF SUMMARY OF THE INVENTION

The present invention provides a method for closing the valve of a fluid passage by employing a multi-step operation in which (i) the valve body of the passage closing valve is permitted to promptly move to a predetermined position short of full closure of the valve body, and then, (ii) the valve body is permitted to move to the valve closing position after a short lapse of time. In developing the present invention, the inventors have also conducted a number of analysis tests on the mechanism of occurrence of the water hammer by using the present closing method.

The inventors of the present invention have unexpectedly discovered, as a result of the afore-mentioned tests, that the water hammer can be prevented by permitting the valve body to stop at a position within a specific range in the first step of closing the valve.

The present invention has been constructed on the basis of the afore-mentioned findings. The present invention, in accordance with a first embodiment, relates to a method for closing a fluid passage with a nearly constant internal pressure in the pipe passage by using an actuator operated-type valve installed in the fluid passage, wherein, first, (a) a valve body is moved in the valve closing direction by increasing or decreasing the driving input to the afore-mentioned actuator to a predetermined value, and then (b) the above mentioned driving input to the actuator is further increased or decreased to fully close the valve after the driving input to the actuator is maintained at the afore-mentioned value for a short period of time, thus making it possible to close the fluid passage while causing no water hammer.

The present invention, in accordance with a second embodiment, relates to a method for closing a fluid passage with a nearly constant internal pressure in the pipe passage by an actuator operated-type valve installed in the fluid passage, wherein, first, (a) a valve body is moved in the valve closing direction by increasing or decreasing the driving input to the afore-mentioned actuator to maintain a valve stroke in the neighborhood of a predetermined value, and then (b) the driving input to the actuator is further increased or decreased to fully close the valve after the valve stroke is maintained at the aforementioned predetermined value for a short period of time, thus making it possible to close the fluid passage without causing a water hammer.

The present invention, in accordance with a third embodiment, relates to a method for closing a fluid passage with a non-constant fluid pressure by using an actuator operated-type valve installed in the passage, wherein, first, (a) a valve body is moved in the valve closing direction by increasing or decreasing the driving input to the afore-mentioned actuator to maintain a valve stroke in the neighborhood of a predetermined value, and then (b) the driving input to the actuator is further increased or decreased to fully close the valve after the valve stroke is maintained in the neighborhood of the predetermined value for a short period of time, thus making it possible to urgently close the passage without causing a water hammer.

The present invention, in accordance with a fourth embodiment, relates to a method for closing a fluid passage in accordance with either the first, second or third embodiments of the invention, wherein the valve is a normally closed-type pneumatic diaphragm valve or a constant volume and normally closed-type pneumatic diaphragm valve whose valve inside volume remains unchanged at the time when the valve is in operation.

The present invention, in accordance with a fifth embodiment, relates to a method for closing a fluid passage in accordance with either the first, second, third or fourth embodiments of the present invention, wherein the time needed to close the valve is set to be extremely short, and a rise value of the pressure of the fluid passage is permitted to be within 10% of the pressure value shown before the valve is closed.

The present invention, in accordance with a sixth embodiment, relates to a water hammerless valve device for closing a fluid passage that includes: (a) a valve body, (b) an actuator for driving the valve, body, (b) an automatic driving force controller for adjusting the driving force to be inputted to the actuator, (c) a valve stroke detector for detecting a valve stroke of the valve body, and (d) a control circuit to which a valve opening/closing command signal S, a valve stroke detection signal Sp and valve stroke setting signal SG are inputted and from which a driving force controlling signal SR is outputted to the afore-mentioned automatic driving force controller so that the valve body is completely closed by the actuator after the valve stroke of the valve body is maintained at a set value for a short period of time.

The present invention, in accordance with a seventh embodiment, relates to a water hammerless valve device in accordance with the sixth embodiment, wherein the valve body is a diaphragm-type valve, and the actuator is a pneumatically operated-type actuator.

The present invention, in accordance with an eighth embodiment, relates to a water hammerless valve device in accordance with either the sixth embodiment or the seventh embodiment, wherein the valve body is a normally closed-type diaphragm-type valve, and furthermore, the time needed for fully closing the valve is set extremely short by the control circuit.

The present invention, in accordance with a ninth embodiment, relates to a water hammerless fluid passage closing device that includes: a water hammerless valve device provided with a valve body, an actuator for driving the valve body, an automatic driving force controller for adjusting the driving force to be inputted to the actuator, a valve stroke detector for detecting a valve stroke of the valve body, and a control circuit to which a valve opening/closing command signal S, a valve stroke detection signal Sp and a valve stroke setting signal SG are inputted and from which a driving force signal SR is outputted to the afore-mentioned automatic driving force controller so that the valve body is completely closed by the actuator after the valve stroke of the valve body is maintained at a set value for a short period of time; a pressure detection sensor for detecting the fluid pressure in the primary side passage; and a computing/storage device provided with a comparison circuit to which a pressure detection signal $P1$ for the internal pressure in the fluid passage from the afore-mentioned pressure detection sensor, a closing time detection signal T from the closing time detection sensor, an allowable pressure rise valve setting signal PM and a closing time setting signal TS are inputted and in which the comparison between the afore-mentioned detection signal $P1$ and the allowable pressure rise valve setting signal PM and further the comparison between the closing time detection signal T and the closing time setting signal TS are effected, a storage circuit for storing the data relating to the relation between the pressure rise value and the stroke setting value corresponding to closing time, and a computing circuit for selecting the most suitable stroke setting value for the allowable pressure rise value setting signal PM and the closing time setting signal TS out of the comparison results in the comparison circuit.

The present invention, in accordance with a tenth embodiment, relates to a device in accordance with the ninth embodiment, wherein the control circuit of the water hammerless valve device is so constructed that the closing time setting signal TS is inputted into the control circuit so that the time for closing the fluid passage can be controlled by adjusting the operation speed of the actuator at the time of the valve closing operation.

The present invention, in accordance with an eleventh embodiment, relates to a water hammerless closing device that includes: (a) a valve body; (b) an actuator for driving the valve body, (c) a vibration sensor removably secured to the pipe passage on the upstream side of the valve; (d) an electropneumatic conversion control device to which a valve opening/closing command signal is inputted and which controls an actuator operating pressure Pa to be inputted to the actuator by the control signal Sc stored in the data storage unit in advance; and (e) a computing control device provided with a comparison computing circuit to which a vibration detection signal Pr from the afore-mentioned vibration sensor, a step pressure setting signal Ps to be supplied to the actuator, a holding time setting signal Ts for maintaining the step pressure, and an allowable upper limit vibration setting signal Prm are inputted and which makes a comparison between the afore-mentioned vibration detection signal Pr and the allowable upper limit vibration pressure setting signal Prm for modifying the step pressure setting signal Ps such that the control signal Sc comprising the afore-mentioned holding time setting signal Ts and the modified step pressure setting signal Ps is outputted to the data storage unit of the afore-mentioned electro-pneumatic conversion control device.

The present invention, in accordance with a twelfth embodiment, relates to a device in accordance with the eleventh embodiment, wherein the computing control device comprises a step pressure setting circuit, a holding time setting circuit, an allowable upper limit vibration pressure setting circuit, a vibration pressure detection circuit, and a comparison computing circuit, and the step pressure setting signal Ps is modified and raised in the event that the vibration detection signal Pr indicated immediately after the actuator operating pressure is changed in a step manner exceeds the allowable upper limit vibration pressure setting signal Prm, while the step pressure setting signal Ps is modified and lowered in the event that the vibration detection signal Pr indicated immediately after the actuator operating pressure is brought to zero from the intermediate step operating pressure exceeds the allowable upper limit vibration pressure setting signal Prm.

The present invention, in accordance with a thirteenth embodiment, relates to a device in accordance with the eleventh embodiment, wherein the electro-pneumatic conversion control device comprises a data storage unit to store the control signal Sc from the computing control device, a signal conversion unit and an electro-pneumatic conversion unit, wherein an actuator operating pressure control signal Se and an actuator operating pressure Pa are outputted from the signal conversion unit and the electro-pneumatic conversion unit respectively on the basis of the control signal Sc' for no water hammer stored in the data storage unit in advance.

The present invention, in accordance with a fourteenth embodiment, relates to a water hammerless closing device that includes: (a) an actuator operated-type valve installed in a fluid passage, (b) an electro-pneumatic conversion device to supply a 2-step actuator operating pressure Pa to the actuator operated type valve, (c) a vibration sensor removably secured to the pipe passage on the upstream side of the afore-mentioned actuator operated type valve, and (d) a tuning box to which a vibration detection signal Pr detected by the vibration sensor is inputted and which outputs a control signal Sc to the electro-pneumatic conversion device to control the level of a step operating pressure Ps' of the afore-mentioned 2-step actuator operating pressure Pa so that the electro-pneumatic conversion device is permitted to output, by adjusting the control signal Sc, the 2-step actuator operating pressure Pa with the step operating signal Ps' capable of bringing the vibration detection signal Pr to near-zero.

The present invention, in accordance with a fifteenth embodiment, relates to a method for closing a fluid passage, wherein (a) a vibration sensor is removably provided on the upstream side of an actuator operated type valve installed in the fluid passage, (b) a vibration detection signal Pr from the vibration sensor is inputted to a tuning box, and (c) a control signal Sc from the tuning box is inputted to an electro-pneumatic conversion device so that a 2-step actuator operating pressure Pa generated in the electro-pneumatic conversion device by the afore-mentioned control signal. Sc is supplied to the actuator for closing the actuator operated type valve in a 2-step operation, wherein the relative relation between the 2-step actuator operated pressure Pa to be supplied to the actuator and the vibration detection signal Pr is checked in the tuning box, and (d) a step operating pressure Ps' is raised in the event that vibration is generated at the time when the actuator operating pressure Pa is lowered in the first step, while the step operating pressure Ps' is lowered in the event that vibration is generated at the time when the actuator operating pressure Pa is lowered in the second step so that a plural number of adjustments by raising or lowering the afore-mentioned step operating pressure Ps' are repeated to obtain the step operating pressure Ps' of the 2-step operating pressure Pa which can bring the vibration detection signal Pr to near-zero, thereby closing the afore-mentioned actuator operated-type valve on the basis of the data of the control signal Sc provided at the time when the 2-step operating pressure Pa with the step operation pressure Ps,' capable of bringing the generation of vibration to near-zero, is outputted from the electro-pneumatic conversion device.

The present invention, in accordance with a sixteenth embodiment, relates to a method to close a fluid passage, wherein (a) a vibration sensor is removably provided on the upstream side of an actuator operated valve installed in the fluid passage, (b) a vibration detection signal Pr from the vibration sensor is inputted to a tuning box, and (c) a control signal Sc from the tuning box is inputted to an electro-pneumatic conversion device so that a 2-step actuator operating pressure Pa generated at the electro-pneumatic conversion device by the afore-mentioned control signal Sc is supplied to the actuator for closing the actuator operated type valve in a 2 step operation, wherein the relative relation between the 2-step actuator operating pressure Pa and the vibration detection signal Pr is checked in the tuning box, and (d) a step operating pressure Ps' is lowered in the event that vibration is generated at the time when the actuator operation pressure Pa is raised in the first step, while the step operating pressure Ps' is raised in the event that vibration is generated at the time when the actuator operating pressure Pa is raised in the second step so that a plural number of adjustments by raising or lowering the afore-mentioned step operating pressure Ps' are repeated to obtain the step operating pressure Ps' of the 2-step operating pressure Pa which can bring the vibration detection signal Pr to near-zero, thereby closing the afore-mentioned actuator operated-type valve on the basis of the data of the control signal Sc provided at the time when the 2-step operating pressure Pa with the step operating pressure Ps,' capable of bringing the generation of the said vibration to near-zero, is outputted from the electro-pneumatic conversion device.

The present invention, in accordance with a seventeenth embodiment, relates to a method in accordance with either the fifteenth embodiment or the sixteenth embodiment, wherein the vibration sensor and the tuning box are allowed to be removed after the data of the control signal Sc for outputting the 2-step operating pressure Pa capable of bringing the generation of vibration to near-zero has been inputted to the storage device of the electro-pneumatic conversion device.

The present invention, in accordance with an eighteenth embodiment, relates to a method in accordance with either the fifteenth embodiment or the sixteenth embodiment, wherein the vibration sensor is located within 1000 mm upstream of the location where the actuator operated-type valve is provided.

The present invention, in accordance with a nineteenth embodiment, relates to a method in accordance with either the fifteenth embodiment or the sixteenth embodiment, wherein the step operating pressure holding time t of the 2-step operating pressure Pa is set at less than 1 second.

Further objects, features and advantages of the present invention will become apparent from the Detailed Description of Illustrative Embodiments, which follows, when considered together with the attached drawings.

LIST OF REFERENCE CHARACTERS AND NUMERALS

Figure 1:
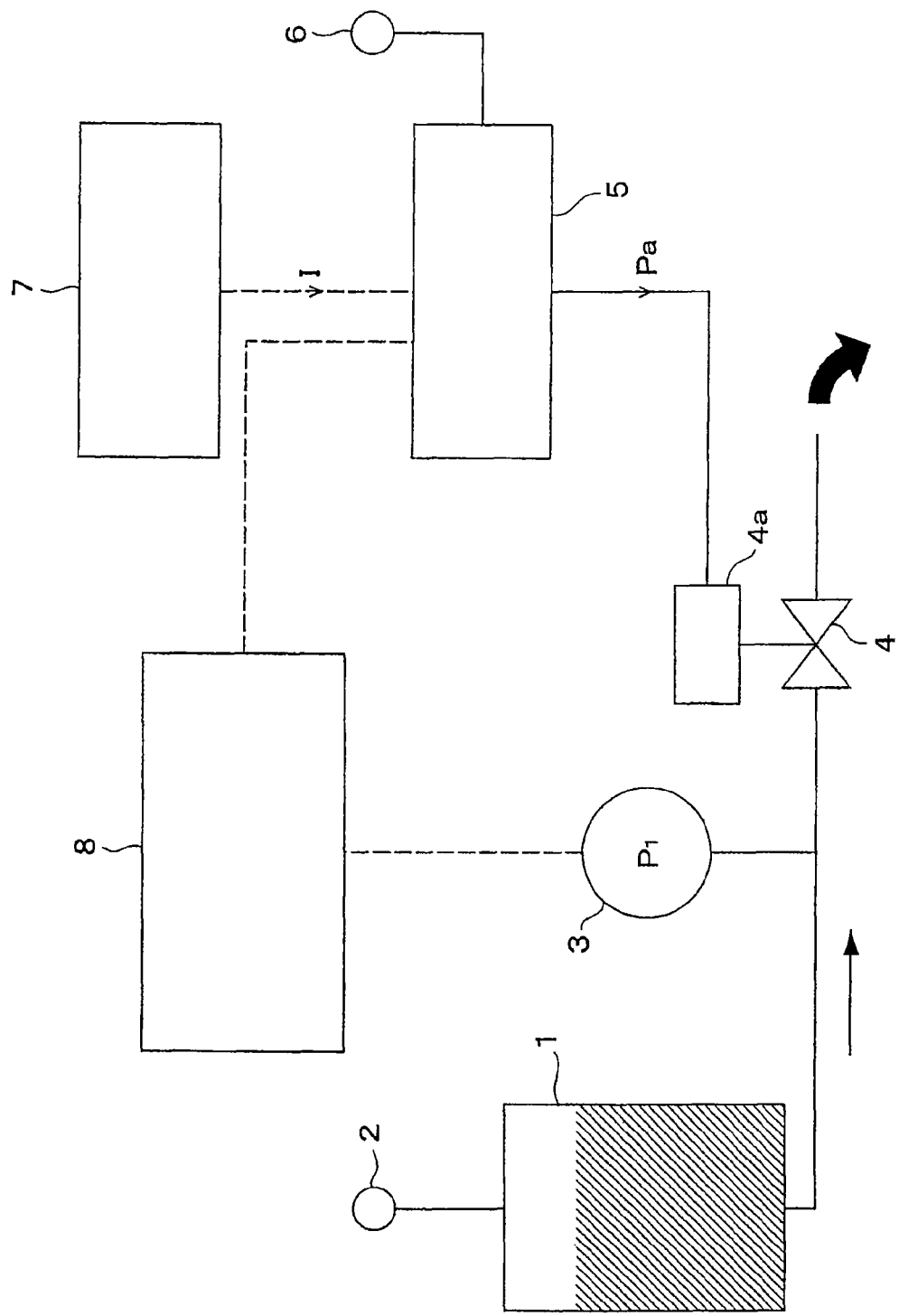
FIG. 1 is a circuit diagram of the testing device used for detecting the occurrence of water hammer in the fluid passage.

PT designates the internal pressure of a water tank.
L1 designates a pipe passage upstream of a valve.
P1 designates an internal pressure in the pipe passage.
P a designates an actuator operating pressure.
Pao designates an air supply pressure.
ΔG designates a valve stroke.
S designates a valve opening/closing command signal.
SG designates a valve stroke setting signal.
SR designates a-driving force controlling signal.
Sp designates a valve stroke detection signal.
1 designates a water tank.
2 designates a source for pressurizing the water tank.
3 designates a pressure sensor.
4 designates a valve.
4a designates an actuator.
5 designates an electro-pneumatic conversion device.
6 designates a valve driving gas source.
7 designates a signal generator.
8 designates a storage oscilloscope.

10 designates a valve body.
11 designates an actuator.
12 designates an automatic driving force controller (i.e., an automatic pressure controller).
13 designates a control circuit.
14 designates a valve stroke detector (i.e., a position detector).
15 designates a computing/storage unit.
16 designates a computing control device.
17 designates an electro-pneumatic conversion control device.
18 designates a vibration sensor.
19 designates a tuning box.
20 designates an electro-pneumatic conversion device.
TC designates a closing time detection sensor.
T designates a closing time detection signal.
TS designates a closing time setting signal.
P1 designates a pressure detection signal.
PM designates an allowable pressure rise value setting signal.
Pr designates a vibration detection signal.
Prm designates an allowable upper limit vibration pressure setting signal.
Ps designates a step pressure setting signal.
Ts designates a signal for setting the time for maintaining step pressure (a closing time setting signal).
Sc designates a control signal.
t designates time for maintaining step pressure, and
Ps' designates Step operating pressure.

DETAILED EXPLANATION OF THE INVENTION

The apparatus and methods of the present invention pertain to a water hammerless valve device for closing a fluid passage and various methods for closing a fluid passage. The apparatus and method embodiment, in accordance with the present invention, are described with reference to the attached Figures wherein like parts are designated by like character references. Prior to describing the invention, a brief description of the observations and principles applied in the development of the invention follows.

Investigation and Observations Pertaining to Flow in Flow Passage

In order to investigate how a water hammer is caused or generated in the moisture, or water, supply lines for semiconductor manufacturing equipment, the inventors have studied and observed pressure changes in the flow passage, which occur when the flow passage is switched from the full opening state to the full closing state by employing a pneumatic (i.e., air pressure operated) diaphragm valve. In this disclosure, the "full opening state" is the state of the flow passage where flow in the flow passage is free and without impediment, such as when a valve in the flow passage is fully open, and the "full closing state" is the state of the flow passage where flow in the flow passage is zero, such as occurs when a valve in the flow passage is fully closed. Also, the inventors have studied and observed pressure changes in the flow passage when the flow passage is in an "intermediate state," which is the state of the flow passage that is intermediate between the full opening state and the full closing state such as occurs when a valve in the flow passage is partially closed and therefore partially open.

FIG. 1 is a circuit diagram of the testing device used for investigating the pressure changes that occur when a valve in a flow passage is switched between the full opening state to the full closing state, with or without an intermediate state (also referred to as the "intermediate opening state"). As shown in FIG. 1, the testing device includes a water tank 1, a source 2 of a fluid for pressurizing the water tank, a pressure sensor 3, a valve 4, an electro-pneumatic conversion device 5, a valve driving gas source 6, a signal generator 7 and a storage oscilloscope 8. In particular, the source 2 is connected to the water tank 1 so as to provide fluid for pressurizing the water tank. The pressure sensor 3 is connected to sense the pressure in the flow passage upstream of valve 4. The valve is connected to and controlled by the electro-pneumatic conversion device 5, which receives signal input I from signal generator 7. The electro-pneumatic conversion device 5 is powered by the valve driving gas source 6. The storage oscilloscope is connected to receive signal information from pressure sensor 3 and to receive signal input pertaining to the state of the electro-pneumatic conversion device 5.

The water tank 1 is provided with the capacity of 30 liters and is of a hermetically sealed structure that is used to store about 25 liters of liquid (i.e., water of 25° C.) therein. The water tank is 1 is pressurized by N2, a fluid from the pressurization source 2, and the pressure is adjustable within the range of 100~300 KpaG. The pressure sensor 3 is capable of detecting water or moisture pressure upstream of the valve 4 with high sensitivity. A diffusion semiconductor-type pressure sensor is employed in the test device.

A diaphragm-type pneumatic valve is used as the valve 4, and the specifications thereof are as follows: (i) fluid inlet pressure 0.1 MPa, (ii) fluid outlet pressure 0.3 MPa, (iii) fluid temperature 10~100° C. and CV value 0.27, (iv) operating air pressure 0.3~0.6 MPa, (v) materials of the parts contacting the liquid (i.e., PTFE for a valve body and PTFE for a diaphragm), and (vi) an inside diameter of the passage is 4 mm. In other words, the valve 4 is a pneumatic diaphragm valve that is normally in the fully closed state, and has a valve body made of synthetic resin. The diaphragm valve body is urged, by the elastic force of springs (not shown), to normally rest on the valve seat so that the valve 4 is maintained in the closed state (i.e., the fully closing state). An actuator 4a, connected to valve 4, is operated when pneumatic pressure for operation is supplied by the electro-pneumatic conversion device 5 with the result that the diaphragm valve body of valve 4 is moved away from the valve seat and maintained in the opened state (i.e., either the fully opening state or in an intermediate opening state).

Accordingly, when the pneumatic diaphragm valve of the normally closed-type is to be closed, it is necessary to reduce the pneumatic pressure for operation supplied by the electro-pneumatic conversion device 5 to the actuator 4a for opening the valve 4.

A person of ordinary skill in the art will recognize that it is within the scope of the present invention to employ a normally opened-type pneumatic diaphragm valve to replace the afore-mentioned normally closed-type pneumatic diaphragm valve. In the case where such a substitution is made, the valve 4 is closed by raising the pneumatic pressure supplied to the actuator 4a because the valve 4 is constructed so that the diaphragm valve body is urged, by the elastic force of springs (not shown), to not normally rest-on the valve seat, which means the valve is maintained in the opened state (i.e., the fully opening state).

Figure 2:
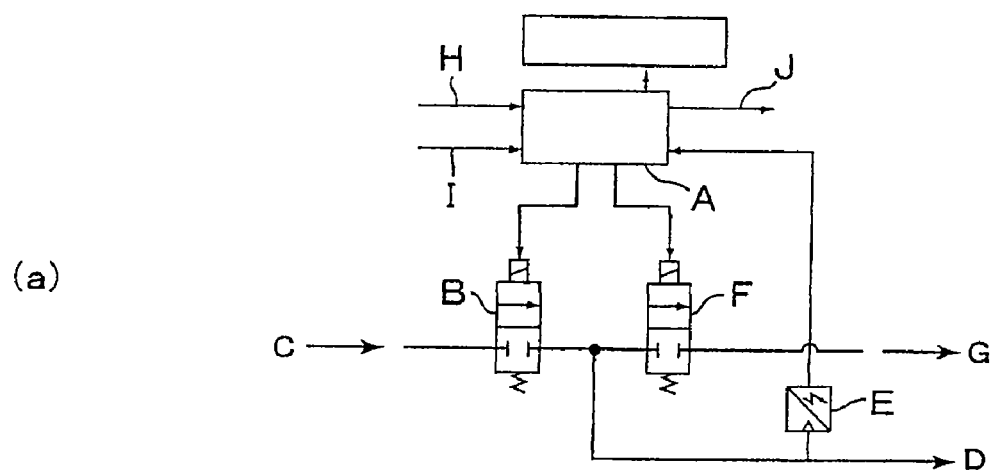
FIG. 2 is a schematic diagram to show an electro-pneumatic conversion device used for the testing device, wherein (a) is a basic block diagram and (b) is a block diagram.
Figure 2:
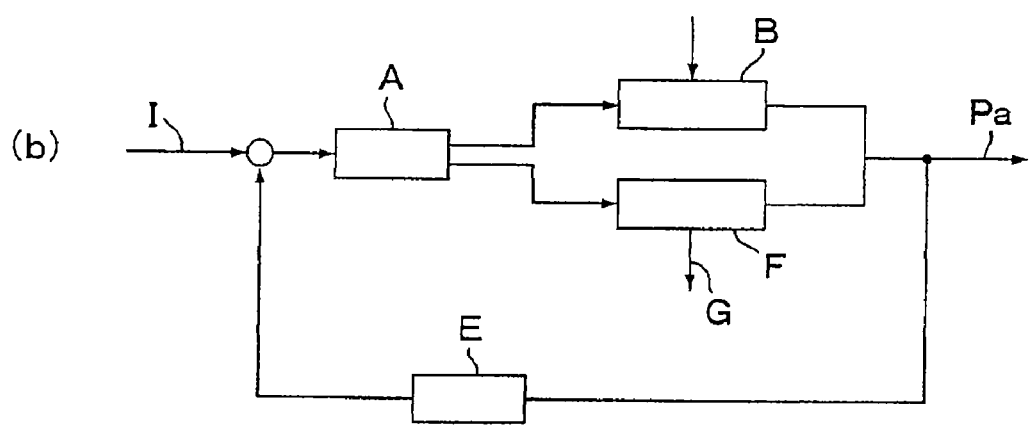

Thus, the electro-pneumatic conversion device 5 is used to supply a driving pressure (i.e., air pressure) to the actuator 4a of valve 4, wherein the driving pressure corresponds to an input signal directing (or setting) the degree of opening of the valve. In other words, the electro-pneumatic conversion device 5 provides the driving pressure used to set the state of the valve 4, such as the fully opening state, the fully closing state, or some intermediate opening state. In the test device of FIG. 1, an electro-pneumatic conversion device 5 of the construction illustrated in FIG. 2 is used.

The electro-pneumatic conversion devices shown in FIGS. 2(a) and 2(b) operate as follows. When the input signal I is inputted to a control circuit A, an air supply electromagnetic valve B opens so that some portion of the pressure C, which is provided by the valve driving gas source 6, is supplied to the actuator 4a for the valve 4. This portion of pressure C, supplied to actuator 4a, is provided as an output pressure Pa or D through the air supply electromagnetic valve B. The output pressure Pa, or D, is also fed back to the control circuit A through the pressure sensor E, and correction operations are effected until the output pressure Pa, or D, corresponding to the input signal I is reached. In FIG. 2, F designates an exhaust electromagnetic valve, G is an exhaust, H is a power source, and J is an output signal to correspond to the input signal I. The output signal J (or the input signal I) is inputted as an input voltage to a storage oscilloscope 8 as explained below.

Figure 3:
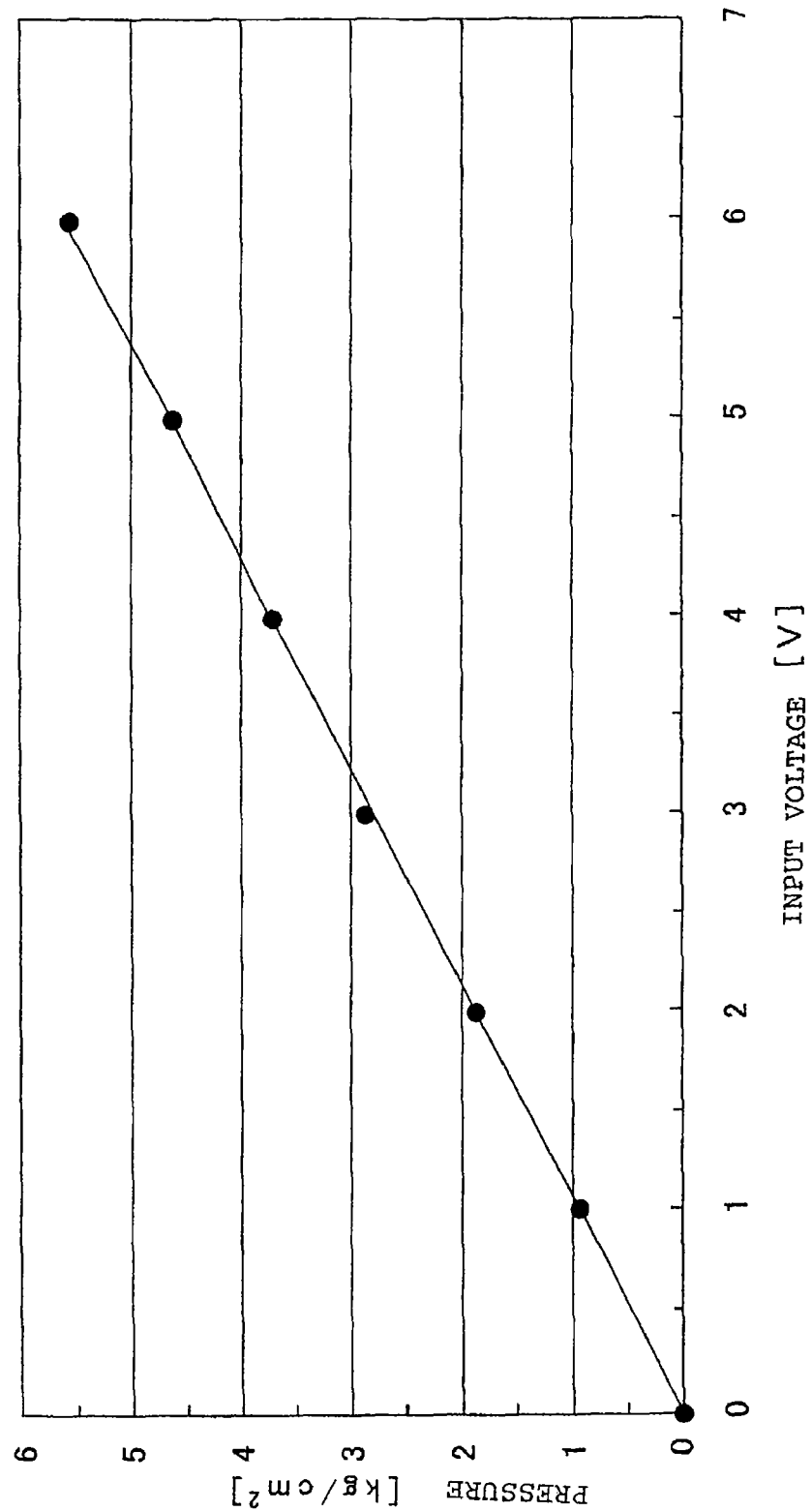
FIG. 3 is a diagram to illustrate the relation between an input signal I (input voltage V) and an output pressure Pa (kgf/c m$^2$·G) in the electro-pneumatic conversion device 5 of FIG. 1.

FIG. 3 is a diagram illustrating the linear relationship between the input signal I (i.e., input voltage V to the aforementioned electro-pneumatic conversion device 5) and the output pressure Pa (or D). In accordance with the above description of a normally closed-type pneumatic diaphragm valve, the valve 4 is maintained in the fully opened state at the input voltage 5V (i.e., corresponding to the operating pneumatic pressure P=about 5 kgf/c m$^2$·G).

A compressor is employed as the air source, i.e., valve driving gas source 6, for operating the valve 4. Thus, the compressor is used as gas source 6 to supply air with the prescribed pressure to electro-pneumatic conversion device 5. And, the signal generator 7 generates the input signal I that is inputted into the electro-pneumatic conversion device 5. In other words, input signal I is a desired voltage output outputted by the signal generator 7 to the electro-pneumatic conversion device 5 as the input signal I.

In addition, the detection pressure signal P1 (i.e., voltage V), generated by the pressure sensor 3 sensing the pressure in the upstream side pipe passage L1, and the input signal I (i.e., input voltage V) inputted to the electro-pneumatic conversion device 5 are both inputted to the storage oscilloscope 8 so it is possible to observe and record changes of the pressure P1 in the passage L1 and the input signal I (i.e., input voltage V), and the like. A storage oscilloscope 8 whose time-axis is graduated in 500 m sec/1 is employed in the test device shown in FIG. 1.

Referring again to FIG. 1, the pressure PT inside the water tank 1 is maintained at a set value of 3 kgf/c m$^2$·G, and the air pressure Pa of 5 kgf/c m$^2$·G is supplied to the actuator 4a to fully open the valve 4. in this case, the inside diameter of the pipe passage L1, between the valve 4 and the water tank 1, was constructed to be 4.0 mm with the length of about 2.5 m, and a water flow rate Q through this pipe passage L1 was about 3.45 liters/min.

Next, changes of the internal pressure P1 in the upstream side of the pipe passage L1 were observed, using the oscilloscope 8, when the air pressure Pa supplied to the actuator 4a for the valve 4 was changed as follows, i.e., (a) 5 kgf/c m$^2$·G (full opening)→0 kgf/c m$^2$·G (full closing), (b) 5 kgf/c m$^2$·G (full opening)→1.9 (intermediate opening)→0 (full closing), (c) 5 kgf/c m$^2$·G (full opening)→1.66 (intermediate opening) →0 (full closing), (d) 5 kgf/c m$^2$·G (full opening)→165 (intermediate opening)→0 (full closing), (e) 5 kgf/c m$^2$·G (full opening)→1.62 (intermediate opening)→0 (full closing), and (f) 5 kgf/c m$^2$·G (full opening)→1.50 (intermediate opening)→0 (full closing).

FIG. 4 shows the results observed due to the investigation. As apparent from FIG. 4 (a) to (f), fluctuations in the amplitude of pressure P1, with the maximum of 9.15 kgfc m$^2$·G, were shown as illustrated in FIG. 4(a) when the valve 4 was fully closed through the one-step closing process of 5 kgf/c m$^2$·G (full opening)→0 (full closing). Under the conditions used in FIG. 4 (a), a water hammer occurs during closure of the valve 4.

Figure 4A:
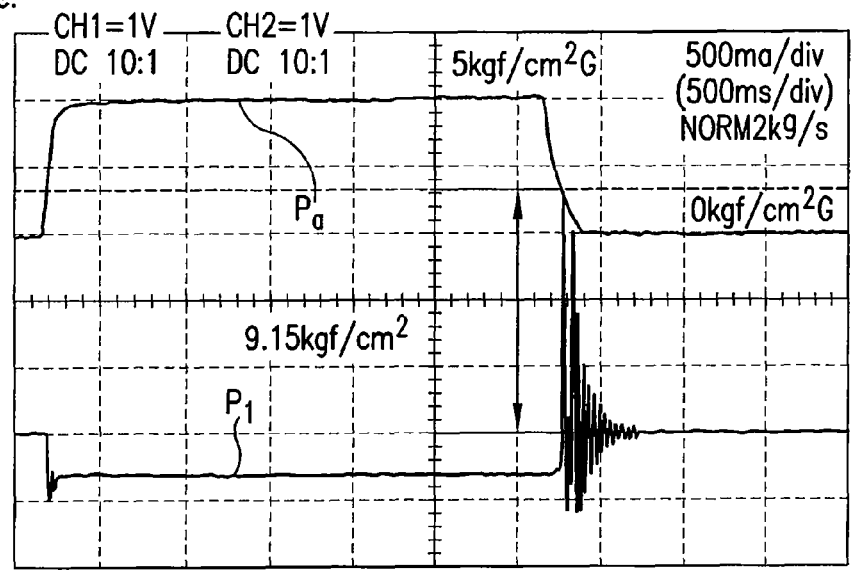
FIG. 4 is; a diagram illustrating how the internal pressure P1 in the pipe passage L1 upstream of a valve changes in the multi-step type valve closing with the internal pressure P1 in the pipe passage L1 being kept constant when the pressure Pa for driving the actuator is changed wherein (a) illustrates the case where Pa is closed from 5 kgf/c m$^2$·G directly to 0 kg, (b) illustrates the case where Pa is lowered from 5 kgfc m$^2$·G to 1.9 kgf/c m$^2$·G and then to 0, (c) illustrates the case where Pa is lowered in steps from 5→1.66→0 kgf/c m$^2$·G, (d) illustrates the case where Pa is lowered in steps from 5→1.65→0 kgf/c m$^2$·G, (e) illustrates the case where Pa is lowered in steps from 5→1.62→0 kgf/c m$^2$·G, and (f) illustrates the case where Pa is lowered in steps from 5→1.50→0.
Figure 4B:
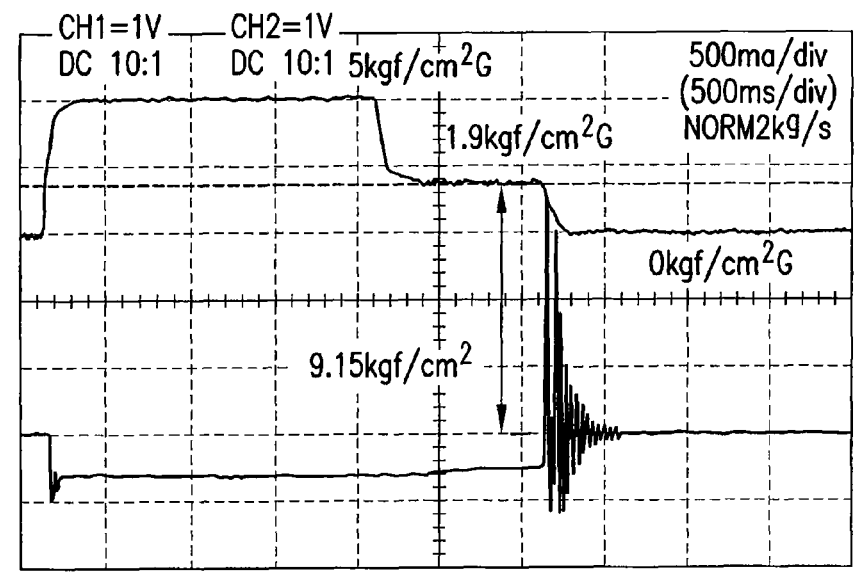
Figure 4C:
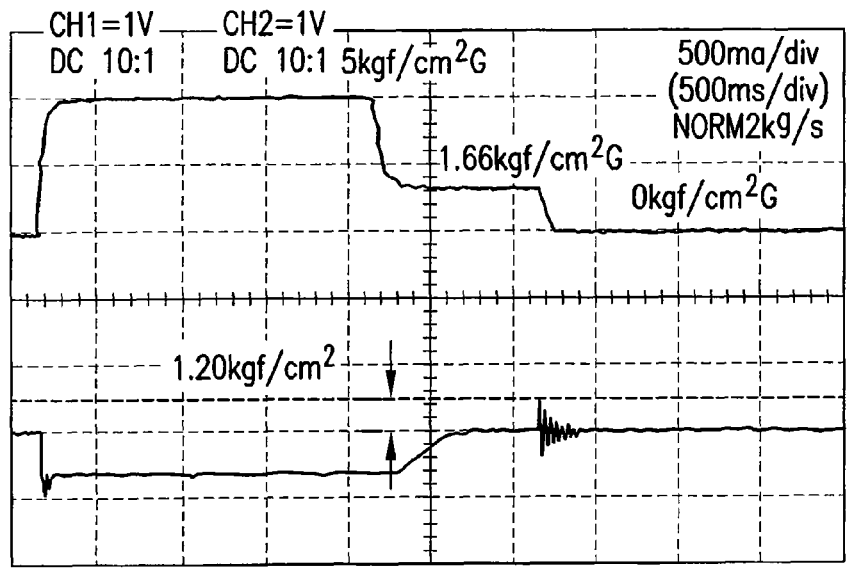
Figure 4D:
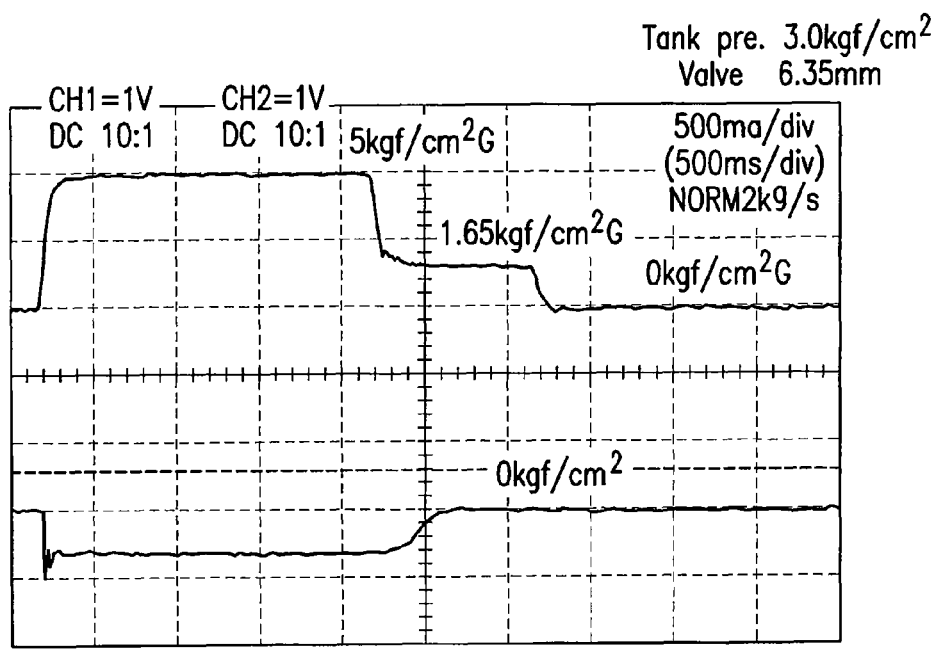
Figure 4E:
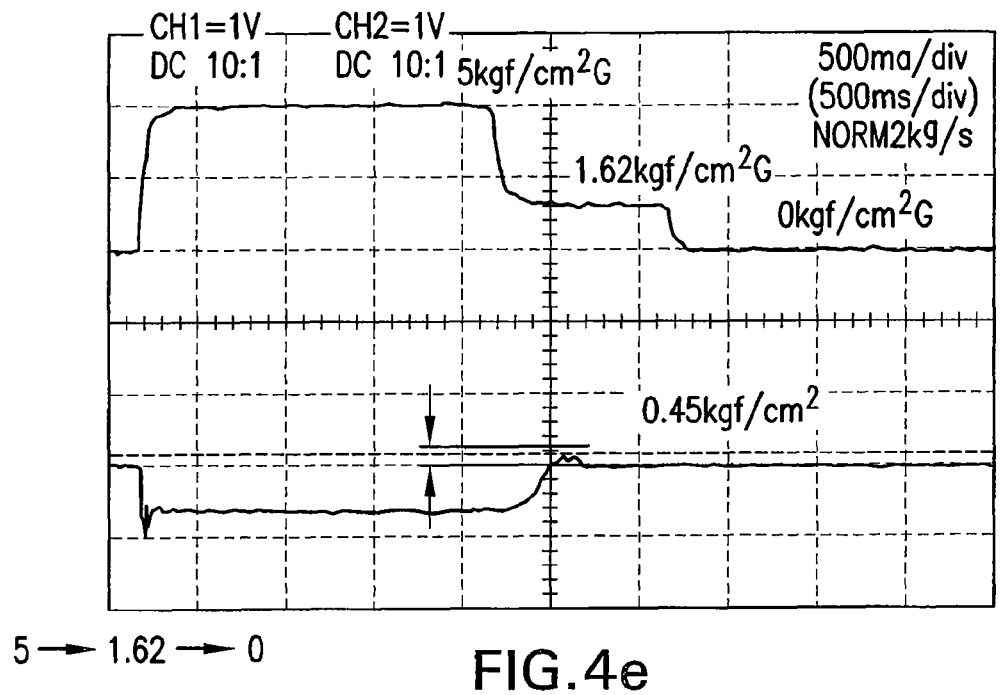

On the other hand, when the air supply pressure Pa was changed in the following multi-step manner, i.e., 5 kgf/c m$^2$ G (full opening)→1.65 kgf/c m$^2$·G (intermediate opening)→0 (full closing) as shown in FIG. 4(d), almost no fluctuation in the pressure P1 was caused in the pipe passage L1. In other words, by employing the multi-step closing procedure in accordance with FIG. 4(d), the complete prevention of the occurrence of a water hammer resulted, which was unexpected.

Figure 4F:
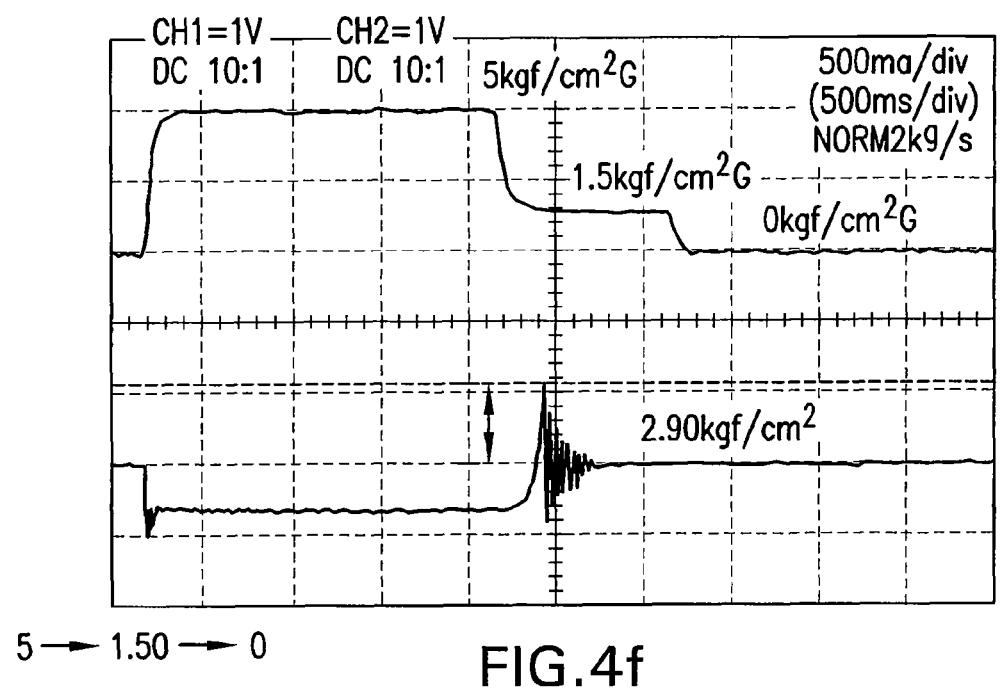

On the other hand, when the air supply pressure Pa was changed in the multi-step manner of 5 kgf/c m$^2$·G (full opening)→1.50 kgf/c m$^2$·G (intermediate opening)→0 kgf/c m$^2$·G (full closing) as shown in FIG. 4(f), there were fluctuations generated in the pressure P1 in the pipe passage L1 with the maximum amplitude of 2.90 kgf/c m$^2$·G. In other words, under the conditions illustrated in FIG. 4(f), a small water hammer still occurred.

These test results indicate that when the valve 4 is switched from the full opening state to the full closing state, the occurrence of a water hammer can be completely prevented by going through the multi-step closing process where the air pressure Pa for operating the actuator 4a is changed from 5V (full opening)→1.65V (the valve opening degree of 0.072 mm/1.93 mm×100=3.73%)→0 (full closing), which corresponds to closing the valve 4 from the full opening state to the full closing state. In other words, it is observed that, when the internal pressure P1 in the pipe passage L1 is kept constant, then (1) the fluid passage can be closed in about 500~1000 msec without causing a water hammer due to quickly closing the valve 4 from the state of full opening to the state of a partial opening, (i.e., to a certain degree of the valve opening) and then finally to the state of full closing after a short lapse of time, and (2) the water hammer is not necessarily prevented by using a multi-step closing process in the event that the intermediate stoppage position of the valve body (i.e., the degree of the partial opening of the valve body) is not equal to a certain critical value, (i.e., is greater or smaller than the critical value).

Figure 5:
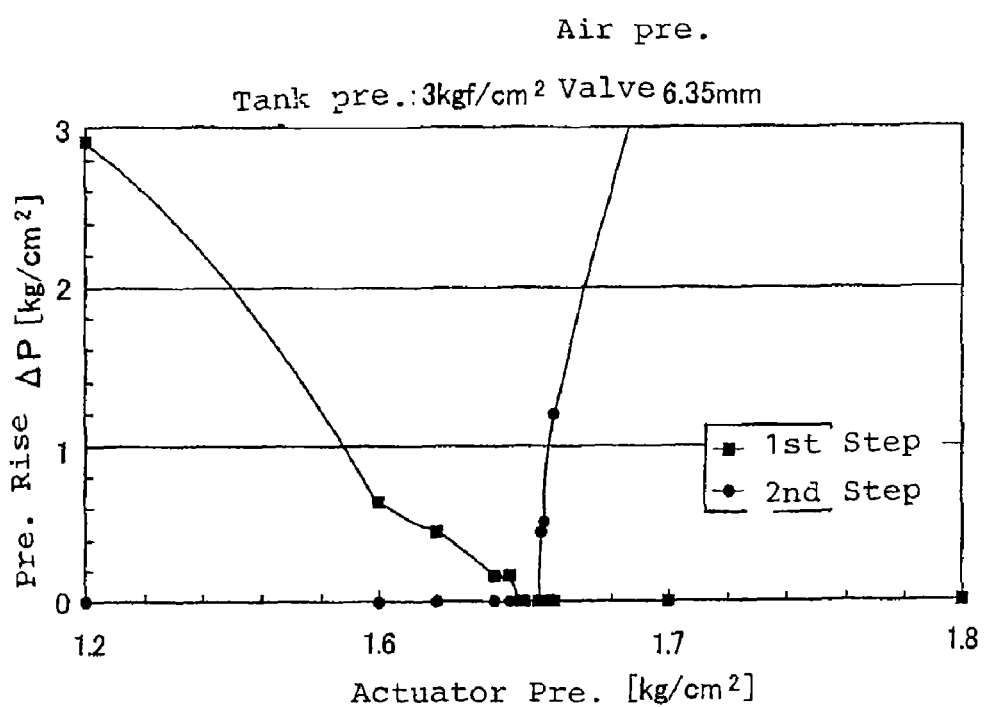
FIG. 5 is a diagram illustrating the relationship between the driving pressure Pa to the actuator and the pressure rise ΔP1 in the multi-step type closing where the internal pressure P1 of the pipe passage is kept constant.

FIG. 5 is a diagram indicating how the internal pressure P1 in the pipe passage L1 rises when the tests were repeated in which the valve 4 was switched from the full opening state to the full closing state under the same conditions as those in FIG. 4. In any of the tests, it was found that when the internal pressure P1 in the pipe passage L1 is constant (3 kgf/c m$^2$·G), the rise of the internal pressure is near-zero if the air pressure Pa supplied to the actuator, at which the valve body is stopped and held for effecting the first step of operation, is about 1.65 kgfc m$^2$·G).'

FIG. 6 illustrates the relationship between pressure Pa supplied to the actuator 4a and the valve stroke ΔG (mm) in tests corresponding to those in FIG. 4. The test conditions are as follows: (a) the internal pressure P1 in the pipe passage L1=3 kgf/c m$^2$·G (constant) and (b) the flow rate Q=3.45 liters/min (constant) where the valve 4 is closed by the multi-step type closing process.

The valve stroke ΔG (mm) is measured using a potentiometer, and is defined to be an amount of distance that the valve shaft moves to press the diaphragm valve body from above from the full closing position to the valve opening direction.

As apparent from FIG. 6 (a) to (f), when the air pressure Pa supplied to the actuator 4a is 1.9 kgf/c m²·G, the valve stroke ΔG is 0.782 mm, and when Pa is 1.66 kgf/c m²·G, ΔG is 0.108 mm. Furthermore, when Pa is 1.65 kgf/c m²·G, ΔG is 0.072 mm.

Figure 6A:
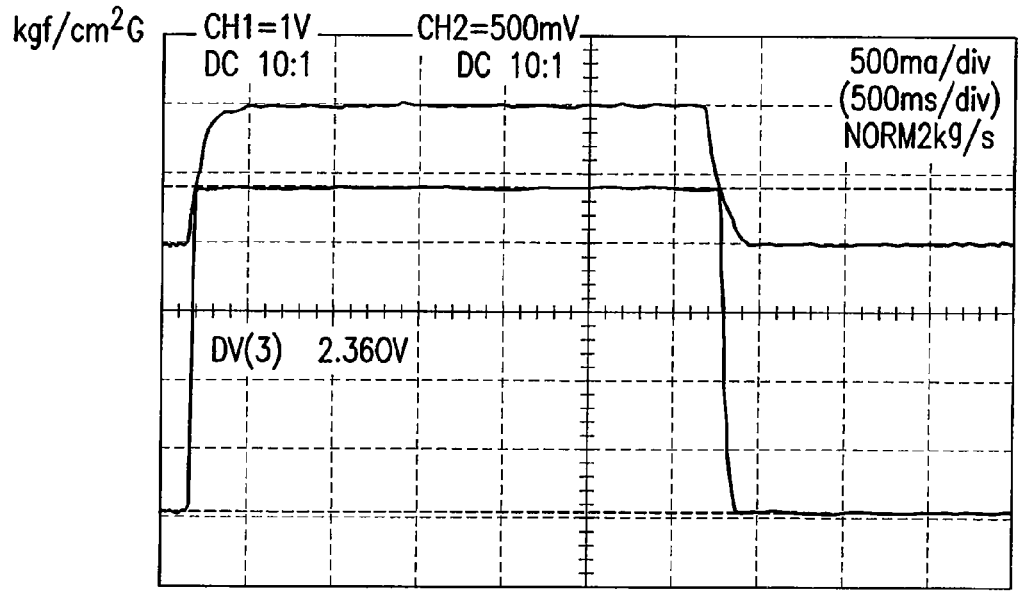
FIG. 6 is a diagram illustrating how a valve stroke ΔG changes in the multi-step type closing, with the internal pressure in the passage P1 being kept constant, when the driving pressure Pa supplied to the actuator is changed wherein (a) illustrates the case where Pa is changed from 5 kgf/c m$^2$·G (full opening) to 0 (full closing), (b) illustrates the case where Pa is changed from 5 kgf/c m$^2$·G (full opening) to 1.9 kgf/c m$^2$·G (intermediate opening) and then to 0 (full closing), (c) illustrates the case where Pa is changed in steps from 5→1.66→0 kgf/c m$^2$·G, (d) illustrates the case where Pa is changed in steps from 5→1.65→0 kgf/c m$^2$·G, (e) illustrates the case where Pa is changed in steps from 5→1.62→0 kgf/c m$^2$·G, and (f) illustrates the case where Pa is changed in steps from 5→1.50→0 kgf/c m$^2$·G.
Figure 6B:
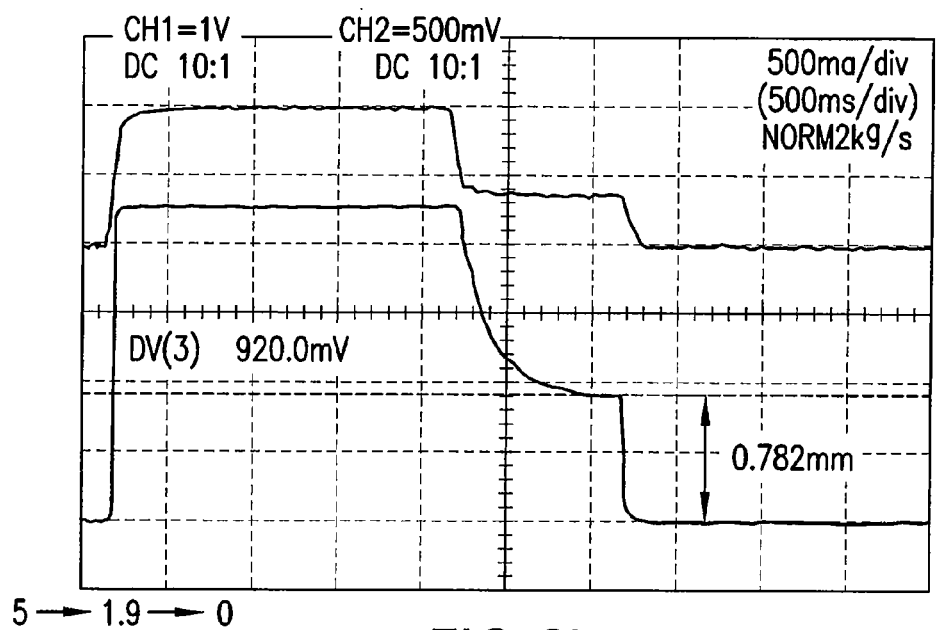
Figure 6C:
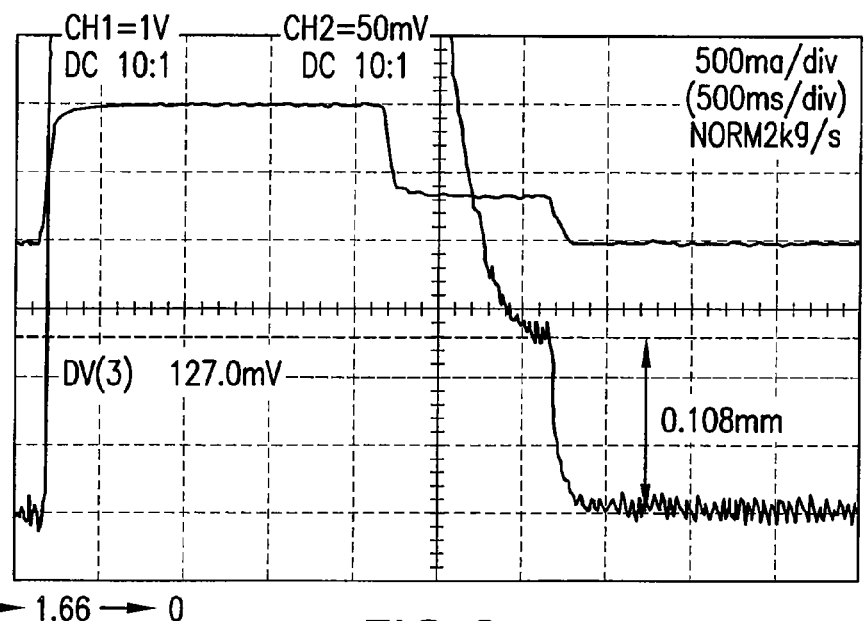
Figure 6D:
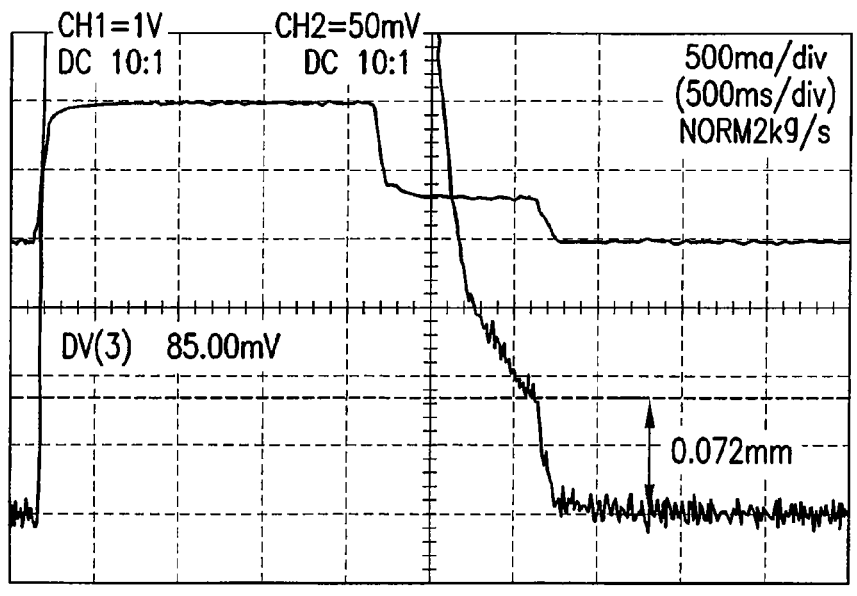
Figure 6E:
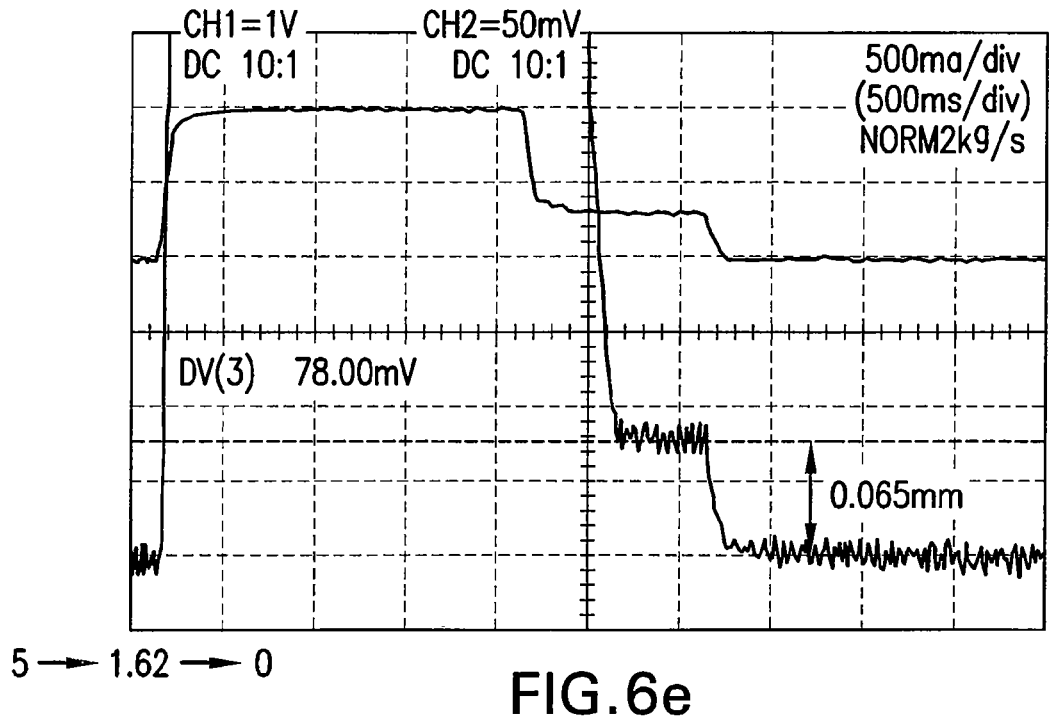
Figure 6F:
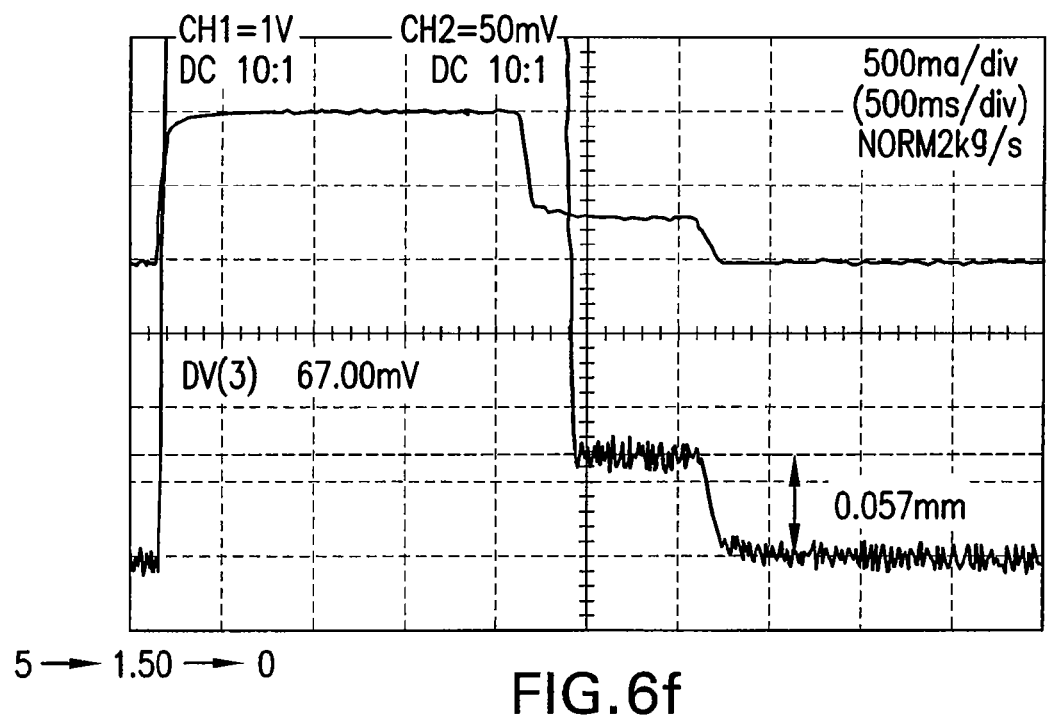

Also, as is apparent from FIG. 6(d), the occurrence of water hammer becomes near-zero in the event that the valve stroke ΔG is 0.072 mm (i.e., the valve opening degree: 0.072/1.93× 100=3.73%). That is, with the multi-step type closing process effected under the condition that the internal pressure P1 in the pipe passage L1 is constant, a water hammer occurs if the valve opening degree ΔG is not equal to the about 0.072 mm, (i.e., is sufficiently larger or smaller than 0.072 mm).

Figure 7:
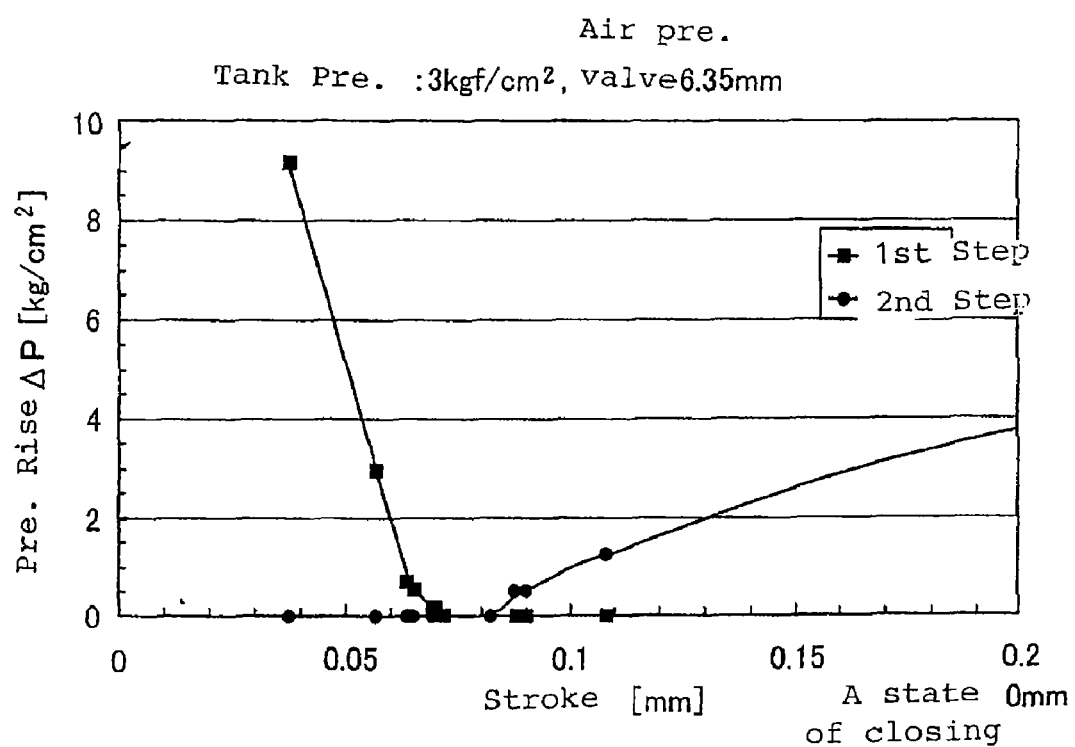
FIG. 7 is a diagram illustrating the relationship between the valve stroke ΔG (mm) and the pressure rise ΔP1 in the pipe passage L1 during multi-step type closing where the internal pressure P1 in the pipe passage is kept constant.

FIG. 7 is a diagram illustrating the actually measured values of the valve stroke ΔG and the pressure rise ΔP1 in the pipe passage L1 where the pressure Pa supplied to the actuator 4a is changed under the same conditions as those provided in FIG. 6. It is observed that the occurrence of the water hammer is near-zero in any case where the intermediate position, wherein the valve body is first stopped and held for the first step of the closing operation, is at the valve stroke ΔG of about 0.07 mm.

Figure 8A:
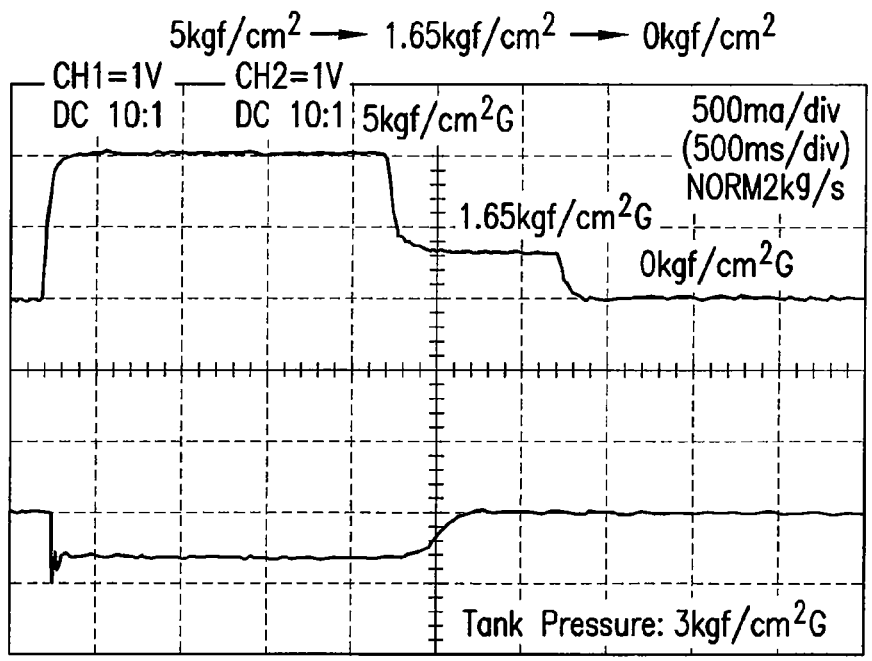
FIG. 8 is a diagram illustrating how the internal pressure P1 in the pipe passage changes in the multi-step type closing (i.e., Pa=5→1.65→0 kgf/c m$^2$·G) where the tank pressure (i.e., the internal pressure P1 in the pipe passage) is changed, wherein (a) illustrates the case where the tank internal pressure P1=3 kgf/c m$^2$·G, (b) illustrates the case where P1=2 kgf/c m$^2$·G and (c) illustrates the case where P1=1 kgf/c m$^2$·G, and (d) illustrates the case where P1=3 kgf/c m$^2$·G.
Figure 8B:
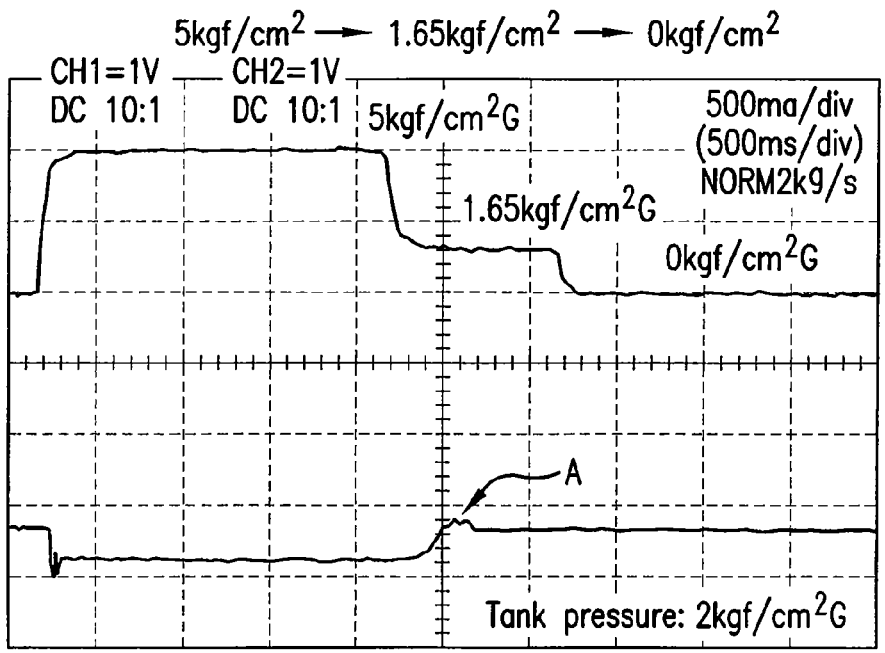
Figure 8C:
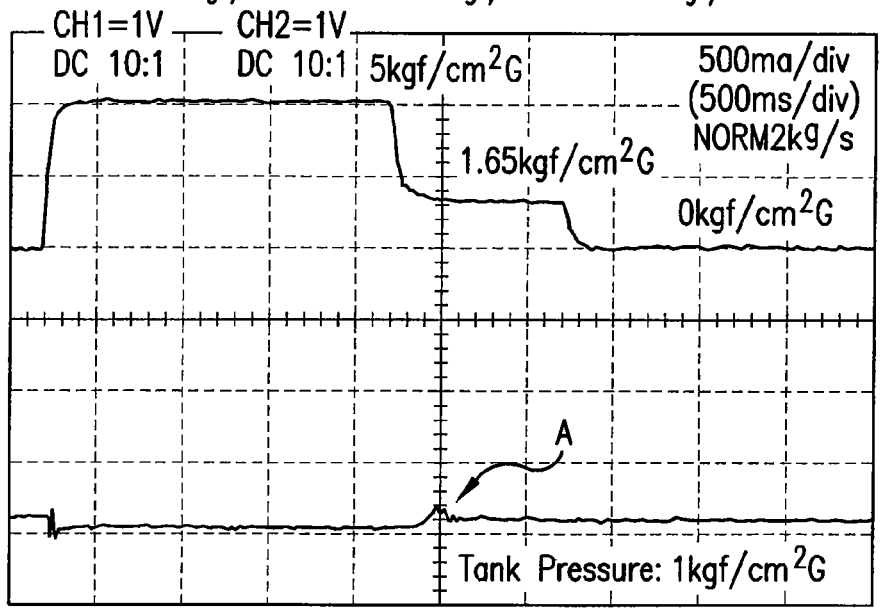
Figure 8D:
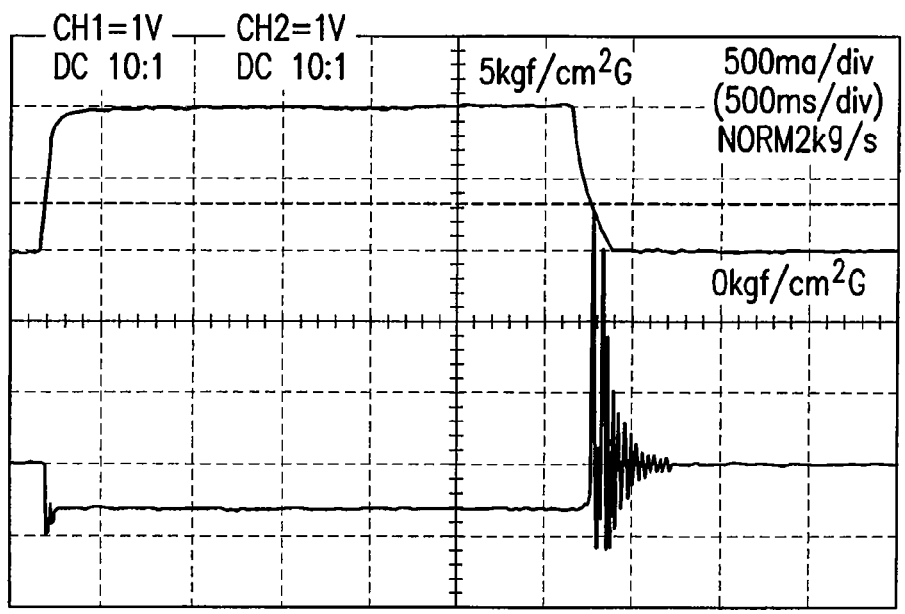
Figure 9A:
FIG. 9 is a diagram illustrating the relationship between the actuator driving pressure Pa and the valve stroke ΔG in the FIG. 8 tests, wherein (a) illustrates the case where the tank internal pressure PT is 3 kgf/c m$^2$—G, (b) illustrates the case where PT=2 kgf/c m$^2$·G, and (c) illustrates the case where PT=1 kgf/c m$^2$·G.
Figure 9A:
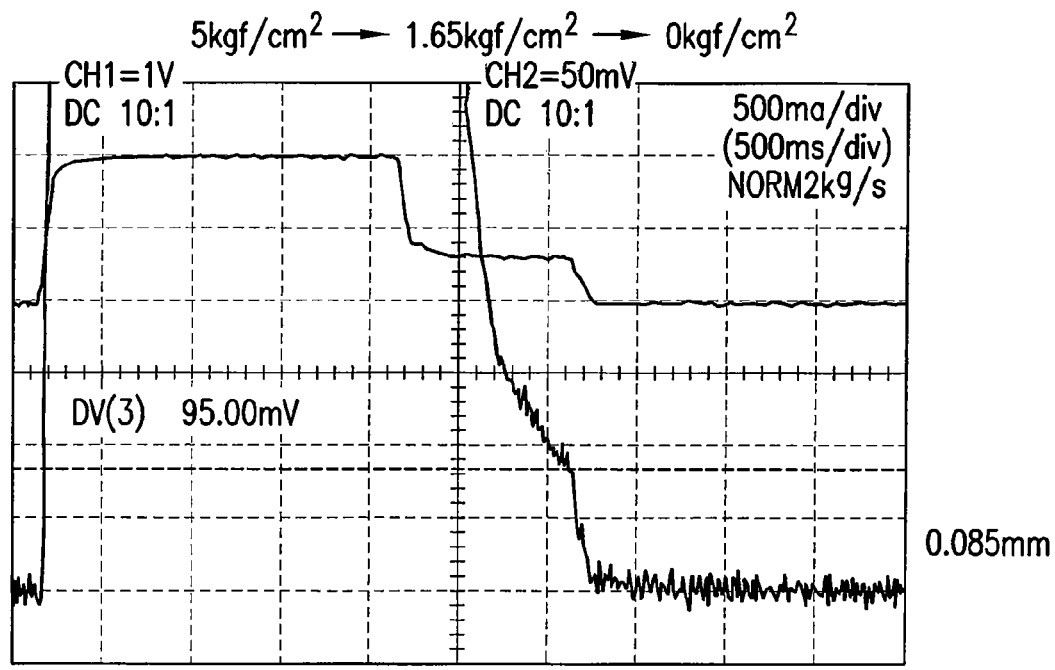
Figure 9B:
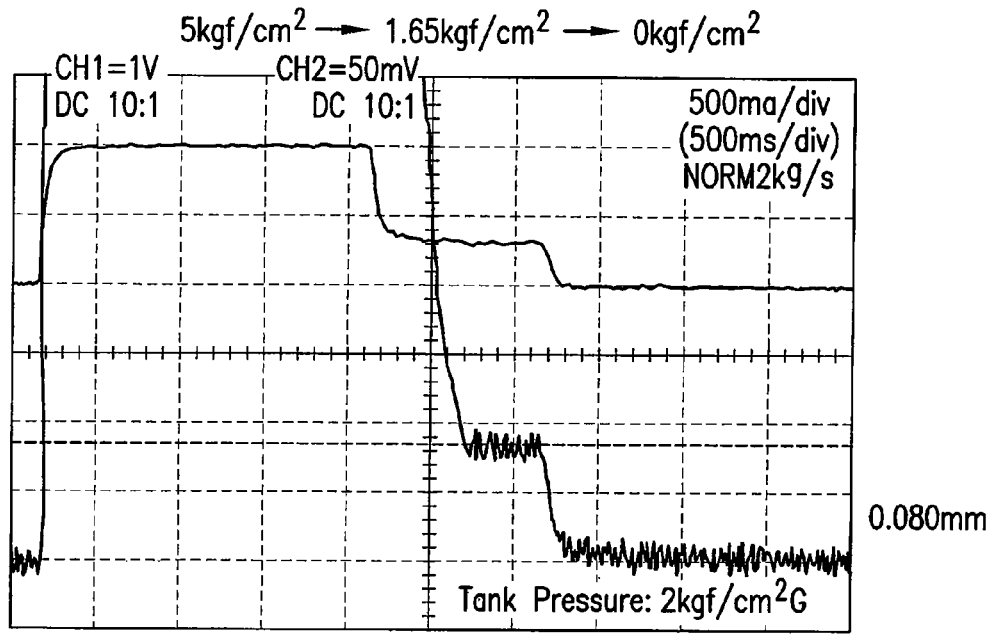
Figure 9C:
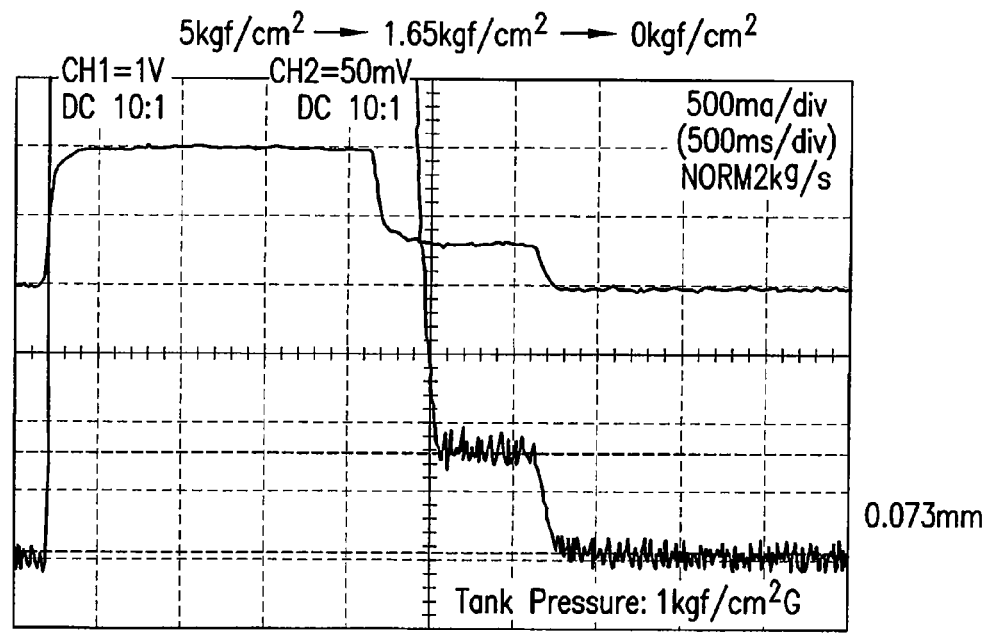

Next, tests were conducted using the test device in FIG. 1 to investigate water hammer prevention under the condition that the internal pressure PT of the water tank 1 is changed. FIG. 8 (a) to (c) shows the results of these tests. FIG. 8(a) indicates that no vibrating rise of the internal pressure P1 in the pipe passage L1 is generated during the multi-step type closing of the valve when the pressure Pa supplied to the actuator was changed as follows: 5 kgf/c m²→1.65 kgf/c m²→0 kgf/c m², under the condition that the internal pressure PT of the tank was 3 kgf/c m²·G. On the other hand, as apparent from the arrows A illustrated in FIG. 8 (b) and FIG. 8 (c), there are seen some fluctuations in the internal pressure P1 in the pipe passage when the internal pressure PT of the tank is changed (i.e., the internal pressure is set at 2 kgf/c m²·G and 1 kgf/c m²·G, respectively).

FIG. 9 shows the valve strokes, measured by the potentiometer at the time of the tests performed in FIG. 8, where the pressure Pa for operating the actuator 4a was 1.65 kgf/c m²·G. As shown in FIG. 9, the valve stroke ΔG changes under the fluid (water) pressure applied to the diaphragm valve body of the valve 4 even when the pressure applied to the actuator 4a is the same (1.65 kgf/c m²·G). As a result, the vibrating fluctuations in the internal pressure in the pipe passage L1 occur as indicated by the arrows A in FIGS. 8 (b) and (c).

Figure 10:
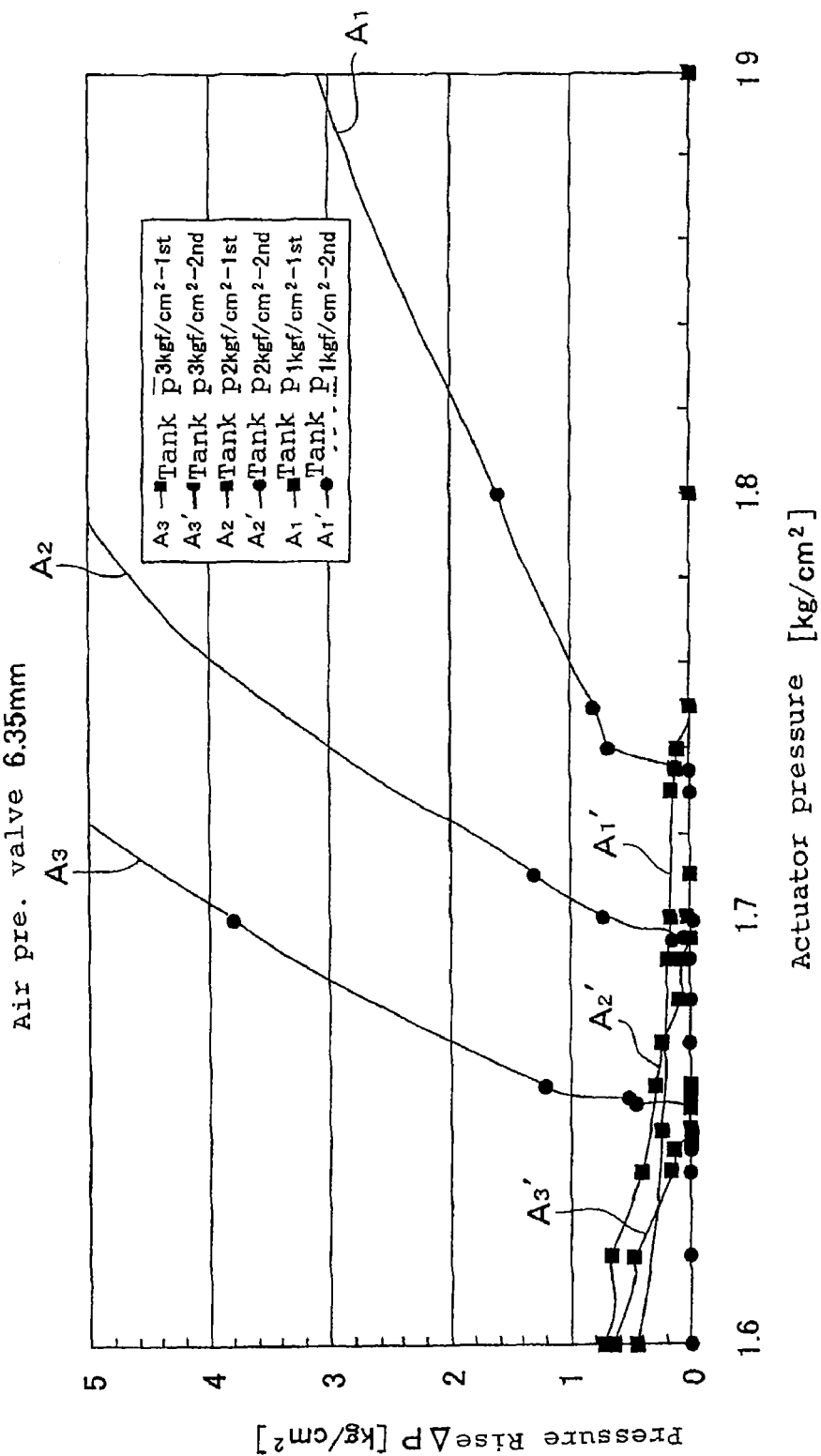
FIG. 10 is a diagram illustrating the relationship between the tank internal pressure PT and the actuator operating pressure Pa, which can prevent the water hammer effect where the valve is subjected to the multi-step type closing.

FIG. 10 is a diagram illustrating the relationship between the internal pressure PT of the tank and the pressure Pa for operating the actuator 4a, which can be used in the multi-step closing procedure to prevent the fluctuations of the internal pressure P1 in the pipe passage L1. The curve A3 shows the relationship between PT and Pa when the internal pressure PT is 3 kgf/c m²·G: The curve A2 and the curve A1 show the relationship wherein PT=2 kgf/c m²·G and PT=1 kgf/c m²·G, respectively. It is clear from the curves A3, A2, and A1 of FIG. 10 that the range of the pressure Pa for the actuator, capable of preventing a water hammer, varies greatly depending on the internal pressure PT of the tank.

As is apparent from the test results shown in FIG. 5 and FIG. 7, in the event that the internal pressure PT of the tank is nearly constant so that the internal pressure P1 in the pipe passage L1 is nearly constant, then the high speed closing of the pipe passage L1 is effected, within a time period of about 500~1000 msec, by the multi-step type closing method, in accordance with the present invention, which can regulate the pressure Pa supplied to operate the actuator 4a of the valve 4 while almost completely preventing a water hammer. More specifically, this effect is observed when the normally closed-type, pneumatically operated diaphragm valve is subjected to the multi-step closing process, (i.e., Pa=5 kgf/c m²·G→1.65 kgf/c m²·G→0), in accordance with the present invention.

However, in the event that the internal pressure PT of the tank (and correspondingly, the internal pressure P1 in the pipe passage L1) fluctuates, as is apparent from FIG. 10, it is difficult for the multi-step type closing method of the present invention to completely prevent the water hammer effect by only controlling the air pressure Pa supplied to the actuator 4a. Accordingly, the present inventors conducted a number of the multi-step type closing tests in which the valve stroke ΔG of the valve 4 is the controlled variable, instead of controlling the pressure Pa supplied to the actuator 4a, with the internal pressure PT of the tank being another explored parameter. The testing device used in these tests is almost the same as that shown in the FIG. 1 except that a potentiometer is added for measuring the valve stroke ΔG of the valve 4.

Figure 11:
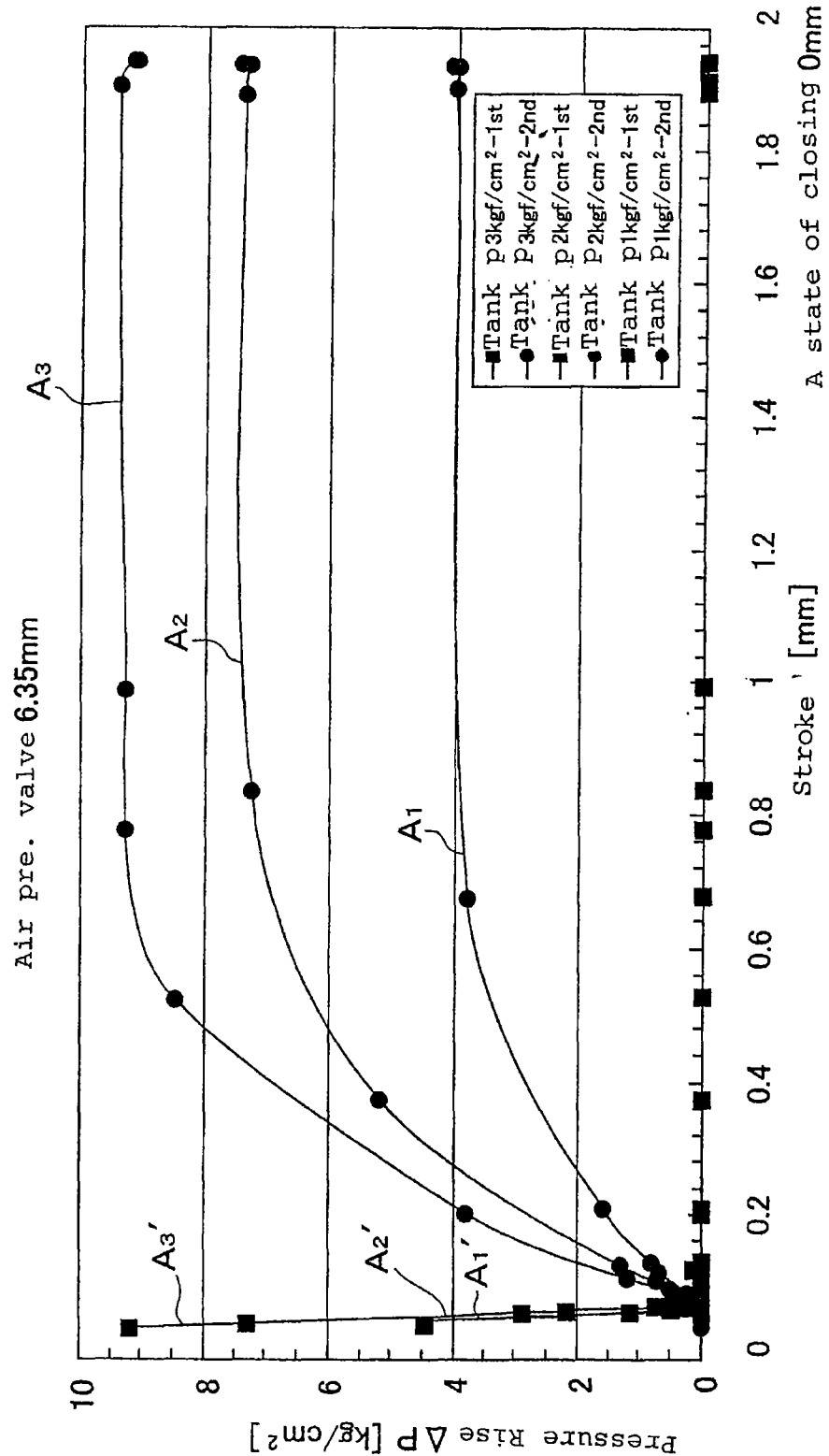
FIG. 11 is a diagram illustrating the relationship between the valve stroke ΔG and pressure rise ΔP1 in the pipe passage with the tank pressure PT being a parameter where the valve is subjected to the multi-step type closing.
Figure 12:
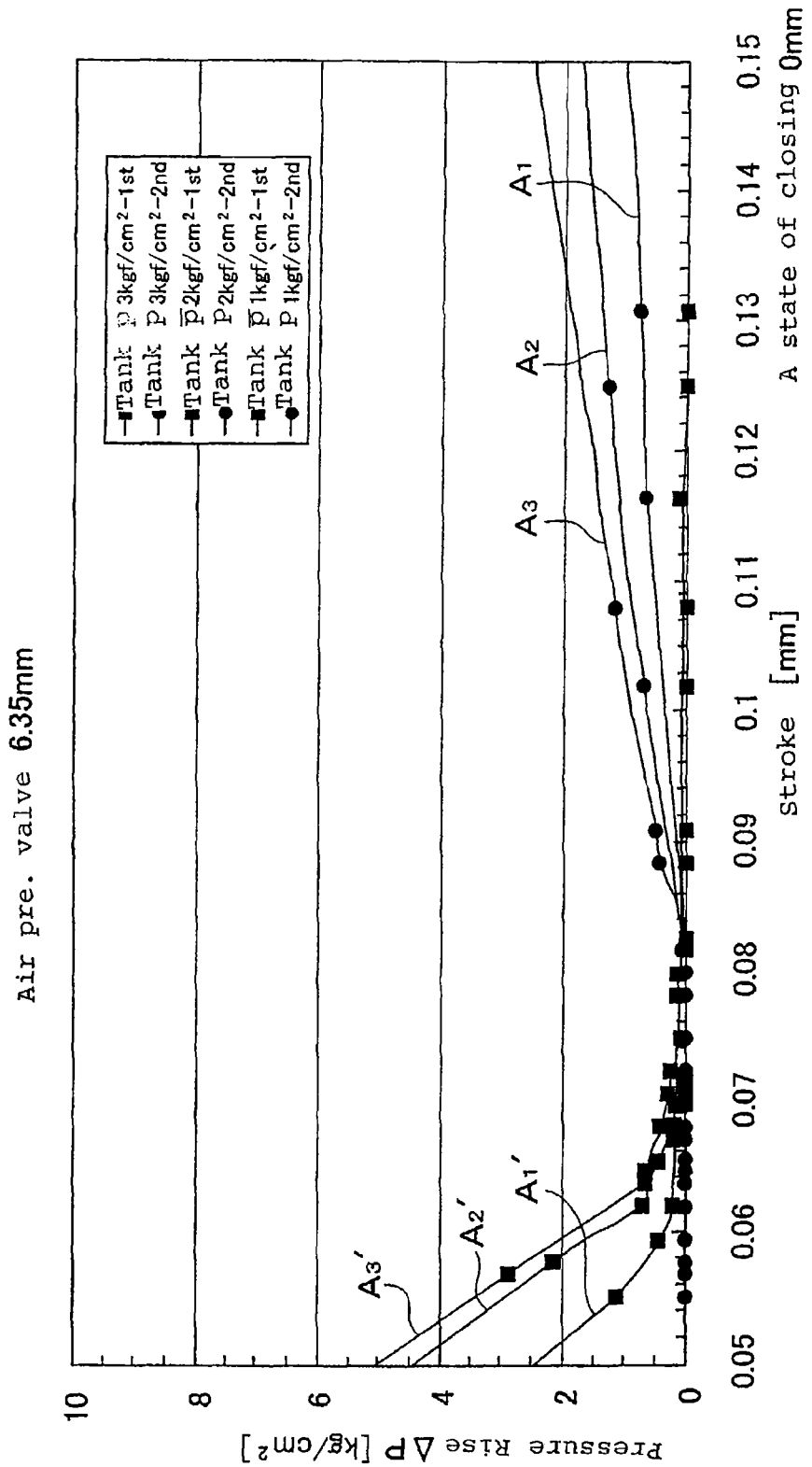
FIG. 12 is an enlarged/expanded view of an important portion of FIG. 11.

FIG. 11 illustrates the relationship between the valve stroke ΔG of valve 4 and the pressure rise ΔP1 in the pipe passage L1 indicated when the valve 4 was subjected to the multi-step type closing process of the present invention, where the tank internal pressure is a test parameter. FIG. 12 is an enlarged and expanded view of a major portion of FIG. 11. In FIG. 11 and FIG. 12, curves A3, A3' show the relationship in which the tank internal pressure PT=3 kgf/c m²·G is tested, while curves A2, A2' and A1, A1' show the relations in which PT=2 kgf/c m²·G and PT=1 kgf/c m²·G, respectively.

As is apparent from FIG. 12, in the event that the multi-step type closing process of the present invention is performed by the valve 4 by means of controlling the valve stroke ΔG, it is possible to rapidly close the valve 4 within a short period of time, of about 500~800 msec, from the full opening state to the full closing state without causing a water hammer. This result is achieved, irrespective as to whether the internal pressure P1 inside the passage L1 is great or small, in such a manner that when the valve stroke ΔG reaches between 0.07-0.08 mm, the valve closing operation is stopped for a short period of time thereby holding the valve in a partially closed state, and thereafter is resumed for effecting the full closure of the valve 4.

The Water Hammerless Valve Device

Figure 13:
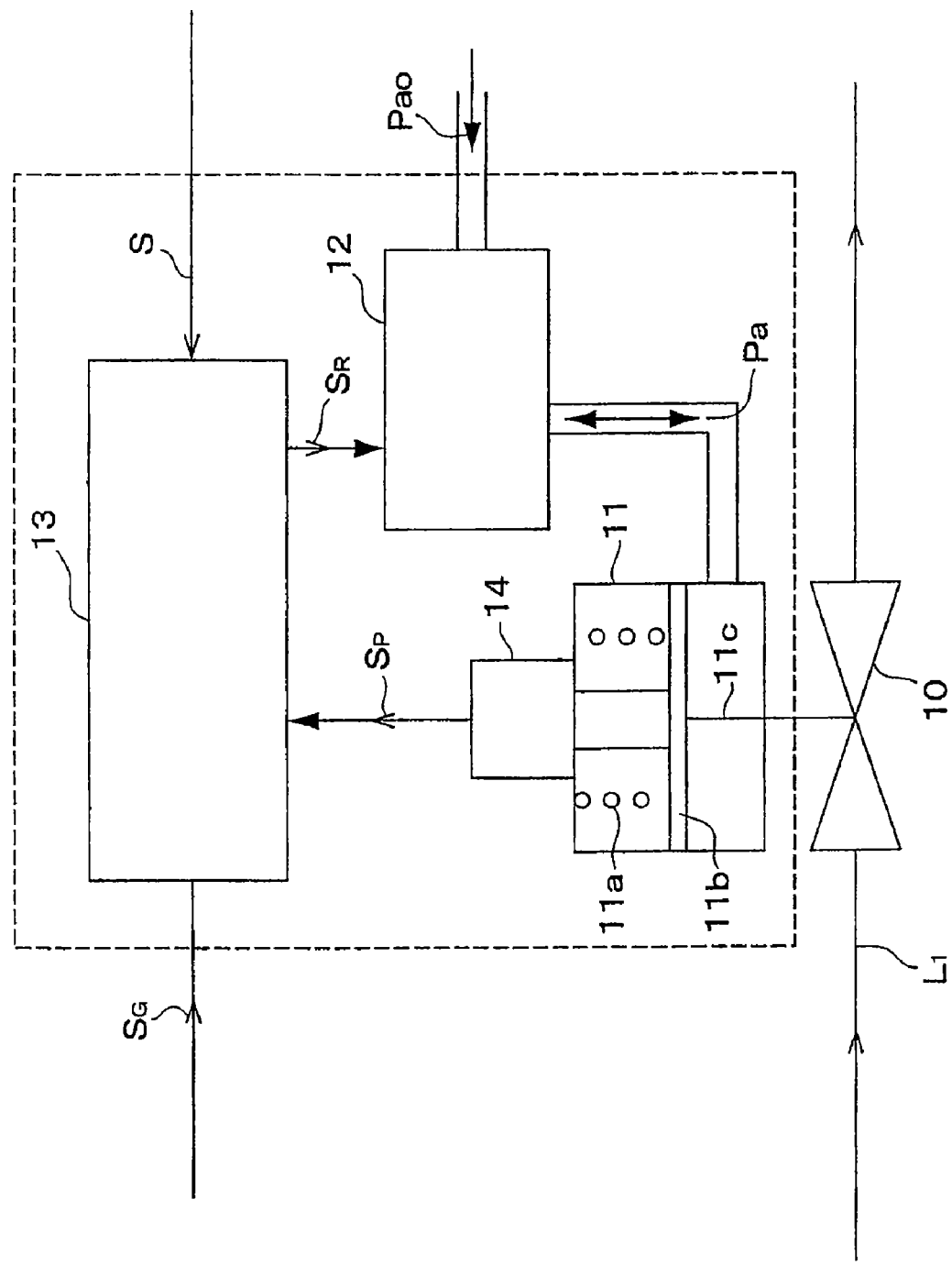
FIG. 13 is a whole block schematic diagram of a water hammerless valve device in accordance with the present invention.

FIG. 13 is a whole block diagram of the water hammerless valve device, according to the present invention, which was constructed based on the test results compiled in FIG. 11, and FIG. 12, and the like. As shown in FIG. 13, the water hammerless valve device includes a valve body 10 of a valve, an actuator 11, an automatic driving force controller 12, a control circuit 13, and a valve stroke detector 14. In particular, the valve body 10 is connected to the actuator 11, which operates the valve body 10 in the same manner as actuator 4a is connected to operate the valve 4. The automatic driving force controller 12 is connected to receive a signal SR from control circuit 13 and to provide actuating operating pressure Pa to the actuator 11. The valve stroke detector 14 is disposed to measure the valve stroke ΔG and to send an input signal SP to the control circuit 13. For the purposes of this disclosure, the term "water hammerless valve device" refers to any valve device that operates to close the valve body in a multi-step closing procedure so as to prevent the generation of a water hammer during closing.

The valve body 10 of the water hammerless valve device, of the present invention, is installed in the pipe passage L1. In this embodiment, a valve body 10 equipped with a diaphragm valve is employed. Persons of ordinary skill in the art will recognize that it is within the scope of the present invention to employ a valve body 10 that can be of any suitable type. For example, the valve body 10 can also be constructed as a disc valve body of a disc valve. In addition, persons of ordinary skill in the art will appreciate that in the non-limiting illustrative embodiment, described in detail as follows, a diaphragm valve, having the valve seat of 4.00 mm in the inside diameter, is employed for the valve provided with the valve body 10. However, the size of the valve can be freely chosen in the range of 10 A to 100 A.

The actuator 11 is a driving part for the valve body 10. Actuator 11 includes spring 11a, piston 11b and shaft 11c. In this embodiment of the invention, a pneumatic cylinder is used as actuator 11. In particular, the valve body 10 is closed (i.e., in the full closing state) when the piston 11b is urged downward by spring 11a, while the valve body 10 is opened (i.e., in the full opening state or in the partial opening state) when the piston 11b is pushed upward against an elastic force of the spring 11a by the driving pressure Pa supplied from the automatic driving force controller 12. In this illustrative embodiment, in accordance with the present invention, a pneumatic cylinder is employed as the actuator 11; however, persons of ordinary skill in the art should recognize that other types of actuators, such as the hydraulic cylinder-type actuator or the electric (i.e., solenoid, motor or piezo-electric element) type actuator can be employed as too as the actuator 11.

In this illustrative embodiment of the present invention, the normally closed-type valve, such as valve 4, is employed; however, a valve 4 of the normally opened-type can alternatively be employed too. Furthermore, in the present embodiment, the valve is closed by means of increasing the driving pressure Pa supplied to the actuator 11. However, the valve can be of the type so constructed that it is closed by means of reducing the driving pressure Pa supplied to the actuator 11.

In the illustrative embodiment shown in FIG. 13, the driving force supplied to the actuator 11 is adjusted by the automatic driving force controller 12. The automatic driving force controller used in this embodiment is constructed so that the air pressure Pao supplied from a pressurization source, such as a compressor (not illustrated) and the like, is controlled to the prescribed pressure Pa so that air pressurized to the pressure Pa is supplied to the actuator 11. Persons of ordinary skill in the art would realize that the automatic driving force controller 12 is an electric output controller when an electric power driven-type actuator is used as the actuator 11.

In the water hammerless device shown in FIG. 13, there are a number of signals inputted into the control circuit 13. These inputs include (a) a detection signal Sp, for the valve stroke ΔG, generated by the valve stroke detector 14, (b) an opening/closing command signal S sent by a valve operator to the valve body 10, (c) a setting signal SG for setting the intermediate stoppage position (i.e., that is, the controlled valve stroke ΔG) in the multi-step type closing operation, and the like. From the control circuit 13, a pressure control signal SR, which outputs the controlled pressure Pa required to give the prescribed valve stroke ΔG, is outputted to the automatic driving force controller 12. In particular, the valve stroke detection signal SP from the valve stroke detector 14, and the setting signal SG for setting the intermediate stoppage position, are compared with each other in the control circuit 13 so that the air pressure Pa supplied to the actuator 11 is adjusted so as to bring a difference between signals SP and SG to nil. Although the control circuit 13 and the automatic driving force controller 12 are illustrated separately in FIG. 13, it is within the scope of the present invention to integrate the control circuit and the automatic driving force controller into a single integrated component.

With further reference to FIG. 13, in the normal state of the water hammerless valve device, the air pressure Pa of a prescribed pressure value (for example, 5 kgf/c m$^2$·G) is supplied from the automatic driving force controller 12 to the actuator 11, thus pushing the piston 11b upward against the spring 11a so that the valve body 10 is fully opened (i.e., in the full opening state). Now, in the state of an emergency, when a valve closing command signal S is inputted to the control circuit 13 the valve body 10 is urgently closed using the so-called multi-step closing operation of the present invention. Under these circumstances, the air pressure Pa supplied to the actuator 11 is instantly lowered to the given pressure value (for example, 1.65 kgf/c m$^2$·G) by the valve stroke setting signal SG, thereby permitting the elastic force of the spring 11a to lower the piston 11b so that the valve body (not illustrated in detail) connected to the shaft 11c is lowered to such an extent that a prescribed valve stroke ΔG is reached. And then, the valve body is stopped and held for a short period of time (for example, 300~500 m sec).

When the valve body 10 is operated by the actuator 11, the stroke detection signal SP from the valve stroke detector 14 is inputted to the control circuit 13. The stroke detection signal SP, and the valve stroke setting signal SG, are compared with each other for the purpose of adjusting the control air pressure Pa so that the valve stroke ΔG of the valve body 10 is brought to a prescribed position in 100-200 msec, and held there. After the valve shaft 11c has been halted for a short period of time (300-500 msec), at the position which permits the valve stroke ΔG to take the prescribed position, the valve shaft 11c is lowered instantly to the valve full closing position by lowering the air pressure Pa to 0 using the automatic driving force controller 12.

With this operation, in accordance with the multi-step closing process of the present invention, the valve body 10 can be fully closed, without causing a water hammer, by taking about 300 to 1000 msec for the full closure of the water hammerless valve device (i.e., in this embodiment the valve is constructed to correspond to the diameter of the pipe passage: 4 mm). In this illustrative, non-limiting embodiment of the present invention, operation has been explained mainly with respect to the case where a diaphragm-type pneumatically operated valve, having the valve seat of 4.00 mm in the inside diameter, is used. However, persons of ordinary skill in the art should realize that the present invention can be applied to bigger types of valves (for example, valves of size 25 A to 100 A), such as glove valves or disc valves.

Figure 14:
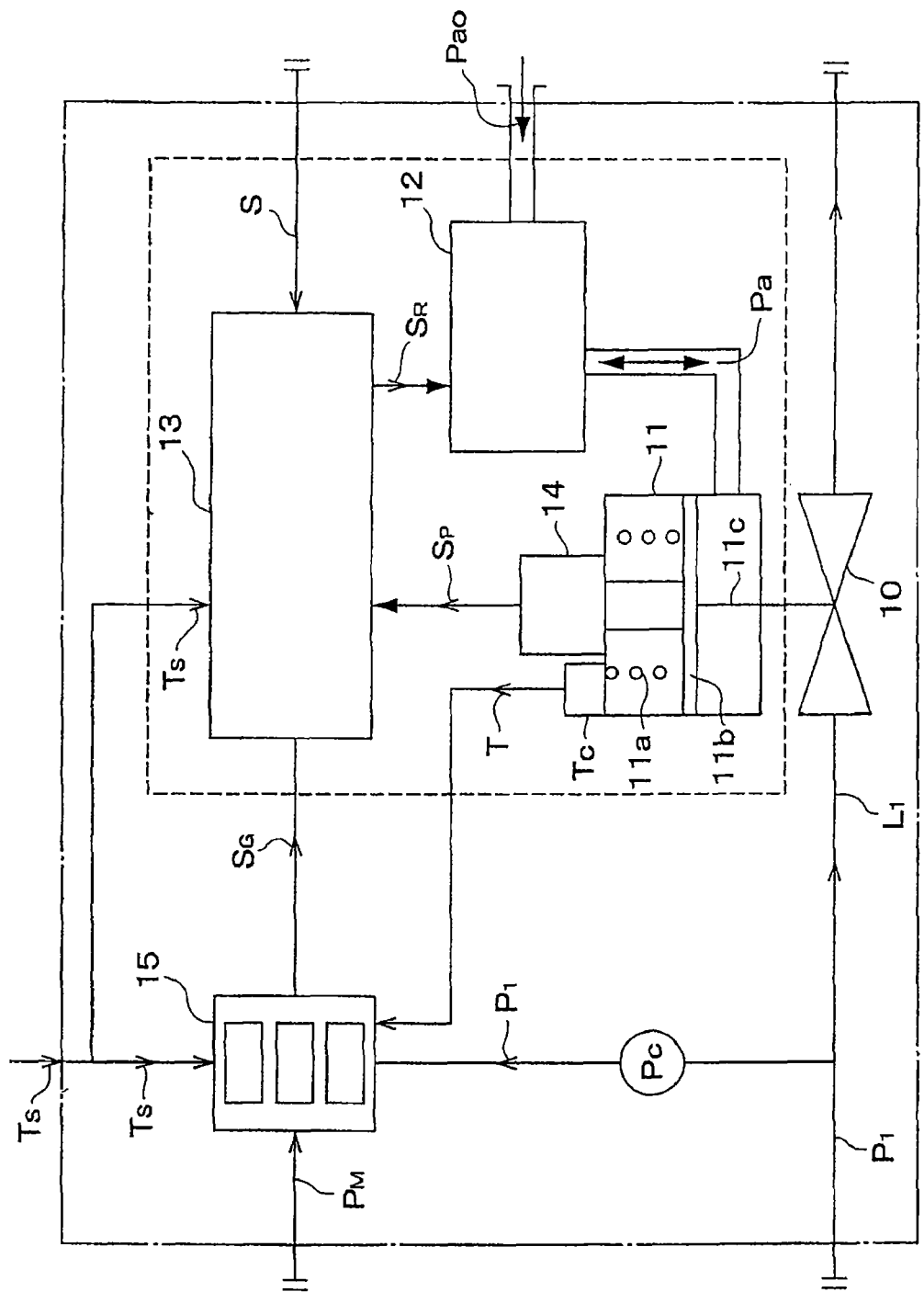
FIG. 14 is a whole block schematic diagram of a first embodiment of the device for water-hammerless closing of the fluid passage in accordance with the present invention.

FIG. 14 illustrates a basic block diagram of a water hammerless closing device of the fluid passage, in accordance with another embodiment the present invention. The water hammerless closing device shown in FIG. 14 is distinguished from the water hammerless valve device shown in FIG. 13 in that the closing device includes two additional controlled elements, (i.e., a valve closing time T and an allowable pressure rise value PM). In other words, a water hammerless closing device, in accordance with the present invention includes (a) a water hammerless valve device as shown in FIG. 13, (b) a primary side pressure detection sensor PC, (c) a detection sensor TC for detecting the valve closing time, and (d) a computing/storage circuit 15 to which the detected values P1 and T are inputted.

As shown in FIG. 14, the computing/storage circuit 15 is connected to send the setting signal SG to control circuit 13 and to receive a detect time T signal from detection sensor TC. The computing/storage circuit 15 is also connected to receive pressure detection signal P1 from primary side pressure detection sensor PC, which is connected to detect the internal pressure P1 in the fluid passage L1.

Furthermore, a closing time setting signal TS is also inputted to the control circuit 13 of the water hammerless valve device and to the computing/storage circuit 15. The operation speed of the actuator 11 (that is, the state of application of operation pressure Pa to the actuator 11) is controlled by adjusting an output state of the driving force control signal SR outputted to the automatic driving force controller 12 from the control circuit 13, thereby adjusting the time taken while moving the valve body 10 from the full opening state the valve body 10 to the full closing state. Of course, the time setting signal TS is used to determine the driving force control signal SR.

The valve closing time detection sensor TC is attached to the actuator 11 to detect time T from the start of the operation of the valve shaft 11c (i.e., corresponding to opening the valve) to the stop of the operation (i.e., corresponding to closing the valve) so that time T, as detected by the detection sensor TC, is inputted to the computing/storage circuit 15. The pressure detection sensor PC is installed at the primary side fluid passage L1 and inputs the detected value P1 of the fluid pressure to the computing/storage circuit 15.

The computing/storage device 15 is provided with (i) a pressure comparison circuit, (ii) a time comparison circuit, (iii) a computing circuit and (iv) a storage circuit. Comparison between the allowable pressure rise value setting signal PM and the pressure detection signal P1 is effected at the pressure comparison circuit of the computing/storage circuit 15, while comparison between the closing time setting signal TS and the closing time detection signal T is effected at the time comparison circuit of the computing/storage circuit 15.

In the storage circuit of the computing/storage circuit 15, there are stored a large amount of data relating to the relation between the stroke setting value and the pressure rise value of the valve body 10 as is actually measured in advance of operation of the valve body, in which the closing time T is a parameter.

Furthermore, in the event that the pressure detection signal P1 exceeds the allowable pressure rise value setting signal PM, depending upon whether or not the closing time T exceeds the closing time setting signal TS, the computing circuit of the computing/storage circuit 15 selects certain data relating to the pressure rise value and the stroke setting value stored in the storage circuit, wherein in this selected data the closing time T stored in the storage circuit is shorter than, but closest to, the closing time setting signal TS. In particular, the computing circuit selects out of the data the stroke setting signal SG corresponding to which pressure detection value P1 is less than the allowable pressure rise value setting signal PM, and then inputs this stroke setting signal SG to the control circuit 13.

The minimum value of the closing time setting signal TS is limited by the operation characteristics of the valve body 10, or of the actuator 11. Normally, the minimum value of the closing time setting signal TS is set at the value of 1-3 sec. However, the closing time setting signal TS for the valve body 10 is selected as long as possible within the allowable range. This selection is made because the longer the closing time, the less likely a water hammer is to occur.

When the water hammerless closing device is used, the closing time setting signal TS and allowable pressure rise value setting signal PM are inputted into the computing/storage circuit 15 so that an appropriate stroke setting signal SG is retrieved and outputted from the storage circuit of the computing/storage device 15, and inputted to the control circuit 13.

When the fluid passage L1 is to be closed, the valve opening/closing command signal S is inputted, from a switch or other like control device, to the control circuit 13, thereby switching the valve body 10 from the full opening state to the full closing state. At this time, if the internal pressure P1 of the primary side passage vibrates due to the occurrence of water hammer, the pressure detection signal P1 is fed back from the pressure detection sensor PC and compared with the allowable pressure rise value setting signal. If the pressure detection signal P1 is found to exceed the allowable pressure rise setting value PM, a new stroke setting signal SG is selected by the computing circuit, and is inputted to the control circuit 13.

As a result of the operation of the computing/storage circuit 15 as described above, the stem 11c of the valve body 10 is immediately returned to a new stroke position so that the pressure rise caused by the afore-mentioned water hammer is brought to the value lower than the allowable maximum pressure rise value PM when the valve body 10 undergoes the next opening/closing operation.

Figure 15:
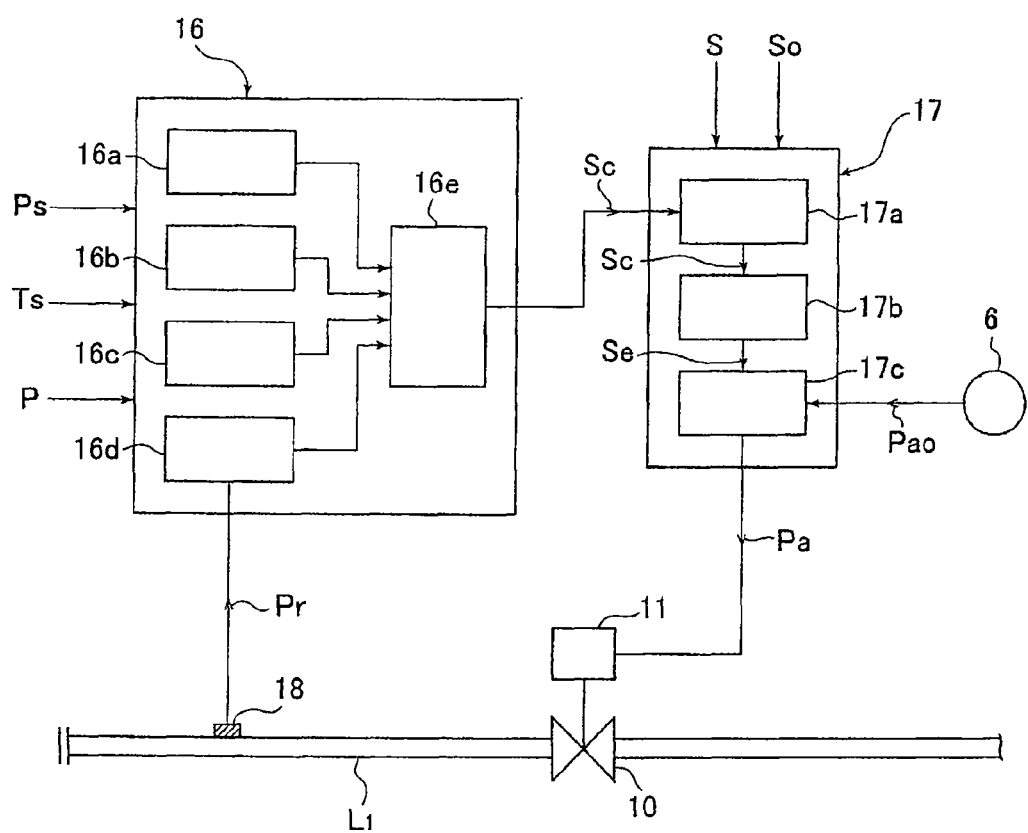
FIG. 15 is a whole block schematic diagram of a second embodiment of the device for water-hammerless closing of the fluid passage in accordance with the present invention.
Figure 16:
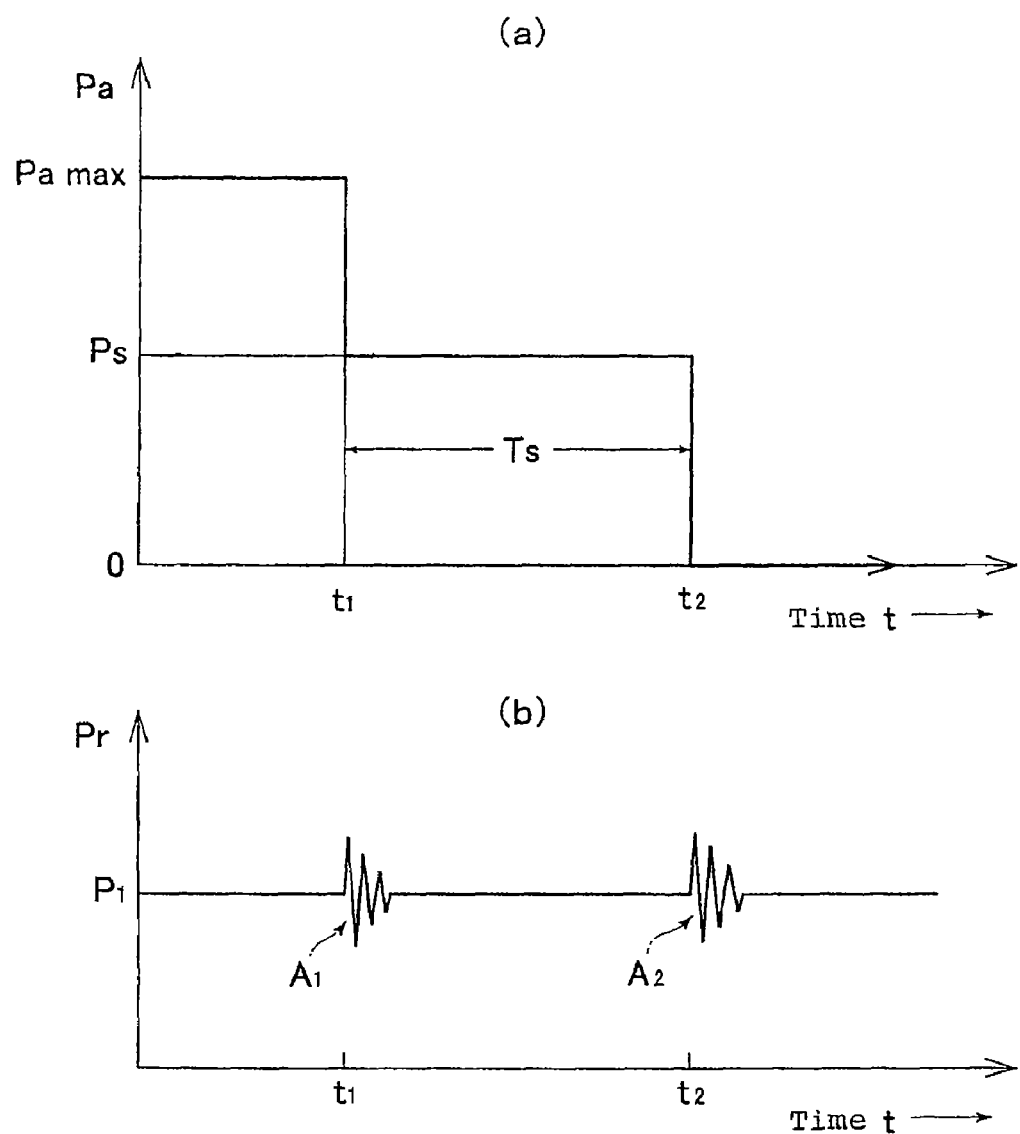
FIG. 16 provides explanatory drawings to illustrate control of the actuator operating pressure Pa in FIG. 16 (a), and an example of the generation of vibration, provided in FIG. 16 (b), in the water hammerless device of FIG. 15.

FIG. 15 and FIG. 16 illustrate a basic construction of a second embodiment of the water hammerless closing device in accordance with the present invention. This second embodiment of the water hammerless closing device is utilized mainly when it is difficult to attach the pressure detector Pc to the existing upstream side passage L1, or when it is difficult to attach the valve stroke detector (i.e., the position detector) to the valve body 10, which distinguishes this second embodiment of the water hammerless closing device from the first embodiment shown in FIG. 14.

With reference to FIG. 15 and FIG. 16, the water hammerless closing device, in accordance with the second embodiment, includes (a) a combination-type of valve body 10, in which the valve stroke detector 13 is removed from the water hammerless valve device shown in FIG. 13, (b) the actuator 11, (c) an electro-pneumatic conversion control device 17, (d) the computing control device 16, which is capable of stepwise switching of the of actuator operation pressure Pa and of controlling the pressure holding time Ts after the stepwise switching, and (e) a vibration sensor 18 removably secured to the upstream side passage L1. The vibration sensor 18 is secured to the upstream side passage L1 so that stepwise switching (i.e., switching to Ps (step pressure: Ps) from Pa max shown in FIG. 16(a)) of the actuator operating pressure Pa, applied to the actuator 11 for the valve body 10, and the holding time Ts for the step pressure Ps can be appropriately selected so as to make it possible to determine, and memorize in advance, the closing conditions of the valve body 10 that permit water hammerless closing.

In other words, as shown in FIG. 15 and FIG. 16, the computing control device 16, the electro-pneumatic conversion control device 17, the vibration sensor 18, the valve driving gas source 6, the valve body 10, and the actuator 11 are all components of the water hammerless closing device embodiment shown in these Figures. The valve driving gas source 6 is connected to provide driving pressure Pao to the electro-pneumatic conversion unit 17c of the electro-pneumatic conversion control device 17. Driving pressure Pao (about 0.6 MPa in this embodiment) from the valve driving gas source 6 is converted to the stepwise operating pressure Pa, as shown in FIG. 16(a), by means of the electro-pneumatic conversion device 17, then the stepwise operating pressure Pa is applied to the actuator 11.

The actuator operating pressure Pa applied to the actuator 11, and the holding time Ts for the operating pressure Pa, are controlled in a manner described below by a control signal Sc arising from the computing control device 16. The control signal Sc has been obtained, in advance of the instant valve closing operation, on the basis of the closing operation tests previously performed on the valve body 10 in each upstream side pipe passage L1. In addition, the vibration sensor 18 and the computing control device 16 are removed from the upstream side pipe passage L1 upon completion of the selection, or determination, of the control signal Sc obtained by performing the closing operation tests on the valve body 10.

More specifically, the computing control device 16 is provided with (a) a setting circuit 16a for setting the step pressure Ps, (b) a setting circuit 16b for the pressure holding time setting signal, (c) a setting circuit 16c for determining the allowable upper limit vibration pressure setting signal Prm, (d) a pipe passage vibration pressure detection circuit 16d, and (e) a comparison computing circuit 16e. Furthermore, signal input that is input into the computing control device 16 includes (i) a vibration detection signal Pr, caused by changes of the internal pressure P1 at the time of closing the valve body 10 and as detected by the vibration sensor 18, (ii) a step pressure setting signal Ps, (iii) a step pressure holding time setting signal Ts, and (iv) an allowable upper limit vibration pressure setting signal Prm. In accordance with the present invention, Ps, Ts and P are selected, and then Ps is modified based on the vibration detection signal Pr until water hammerless closing of the valve body 10 is achieved.

To achieve this result, the vibration detection signal Pr and the allowable upper limit vibration pressure setting signal Prm are compared at the comparison computing circuit 16e of the computing control device 16. In the event that a difference is found between these two signals, the step pressure setting signal Ps is modified as will be explained below so that a modified control signal Sc, including the modified step pressure setting signal Ps and the holding time setting signal Ts, is inputted to a data storage unit of the electro-pneumatic conversion control device 17. This modified control signal Sc is inputted into the data storage unit 17a, which inputs a signal Sc' to the signal conversion unit 17b, which inputs a signal Se to electro-pneumatic conversion unit 17c, which then supplies a modified actuator operating pressure Pa to the actuator 11.

The electro-pneumatic conversion control device 17 is provided with a data storage unit 17a, a signal conversion unit 17b (such as signal generator 7), and an electro pneumatic conversion unit 17c (such as an electro-pneumatic conversion device 5). The actuator operating pressure Pa, to be supplied to the actuator 11, is switched in a stepwise manner as shown in FIG. 16(a) by inputting the actuator operating control signal Se from the signal conversion unit 17b to the electro-pneumatic conversion unit 17c. As shown in FIG. 15, the valve opening/closing command signal S and the switching signal So, dealing with the type (NO: normally opened-type valve or NC: normally closed-type valve) of the valve body 10 are inputted to the electro-pneumatic conversion control device 17.

Referring again to FIGS. 15 and 16, first, the vibration sensor 18 is fixed in the pipe passage L1. Then, the step pressure setting signal Ps, the step pressure holding time setting signal Ts, and the allowable upper limit vibrating pressure setting signal Prm are appropriately inputted to the computing control device 16. Likewise, the valve body switching signal So and the actuator operating fluid supply pressure Pao for the electro-pneumatic conversion control device 17 are appropriately set and inputted. Thereafter, the valve opening/closing command signal S is inputted to effectuate supply of the actuator operating pressure Pa, as shown in FIG. 16 for example, to the actuator 11 for the valve body 10.

Now, the stepwise closing operation of the valve body 10 is explained as follows with reference to FIG. 16(a). At the time T1, the fluid passage of the valve body 10 is partially closed and is brought to the intermediate closure when the actuator operating pressure Pa is lowered from Pa max to Ps. Furthermore, at the time T2, when the set holding time Ts has elapsed, the valve body 10 is completely closed by bringing the actuator operating pressure Pa to zero. In the meantime, if the internal pressure P1 of the pipe passage L1 is changed due to the occurrence of water hammer (See, for example curves A1 and A2 in FIG. 16(b)), the change is detected by the vibration sensor 18 such that the vibration detection signal Pr is inputted to the computing control device 16.

As part of the operation of the water hammerless closing device of FIG. 15, the detection signal Pr and the allowable upper limit vibrating pressure setting signal Prm are compared at the computing control device 16. The step pressure setting signal Ps is subsequently modified and slightly lowered in the case where, although the vibration does not occur or falls within an allowable range at the position of A1 (i.e., at time t1), the vibration exceeds the allowable value Prm at the position of A2 (i.e., at time t2). Then, the modified step pressure setting signal Ps, and the holding time setting signal Ts for the signal Ps, are outputted together as the control signal Sc from the computing control device 16 to the electro-pneumatic conversion control device 17 so that the same closing operation tests on the valve body 10 are repeated thereafter.

On the other hand, in the case where the vibration occurring at the position of A1 (i.e., at time t1) exceeds the allowable upper limit vibrating pressure setting signal Prm, the setting signal Ps is modified and slightly raised. Under these circumstances, the appropriately modified setting signal is outputted as the modified control signal Sc from the computing control device 16 to the electro-pneumatic conversion control device 17 so that the same closing operation tests on the valve body 10 are repeated thereafter.

By repeating the operation tests as explained above, the intermediate operating pressure Ps (i.e., the step pressure setting signal Ps) for the actuator 11 required to achieve water hammerless closing of the pipe passage L1, which is equipped with the vibration sensor 18, is selected with respect to the prescribed step pressure holding time setting signal Ts (i.e., valve closing time Ts). This selection is made so the control signal Sc selected corresponds to the most suitable step pressure setting signal Ps for causing no water hammer and to the holding time setting time Ts for the signal Ps stored in the data storage unit 17a of the electro-pneumatic conversion control device 17. In this way, effective closing of the pipe passage L1 is conducted thereafter by controlling the actuator operating pressure Pa on the basis of the stored control signal Sc.

In the embodiment shown in FIG. 15 and FIG. 16, the actuator operating pressure Pa is switched and controlled in 2 steps. However, it is within the scope of the present invention to operate the valve body 10 of the water hammerless closing device of the present invention so that it can be switched from the full opening state to the full closing state, and vice versa, in 3 steps or 4 steps when necessary. In addition, while the step holding time setting signal Ts is normally set at about 0.5 to 1 second, it has been observed that the shorter the time Ts becomes, the more difficult it will be to find the necessary conditions for effecting a water hammerless closing. However, it is within the scope of the present invention to utilize a holding time setting signal Ts that is shorter than 0.5 to 1 second.

Figure 17:
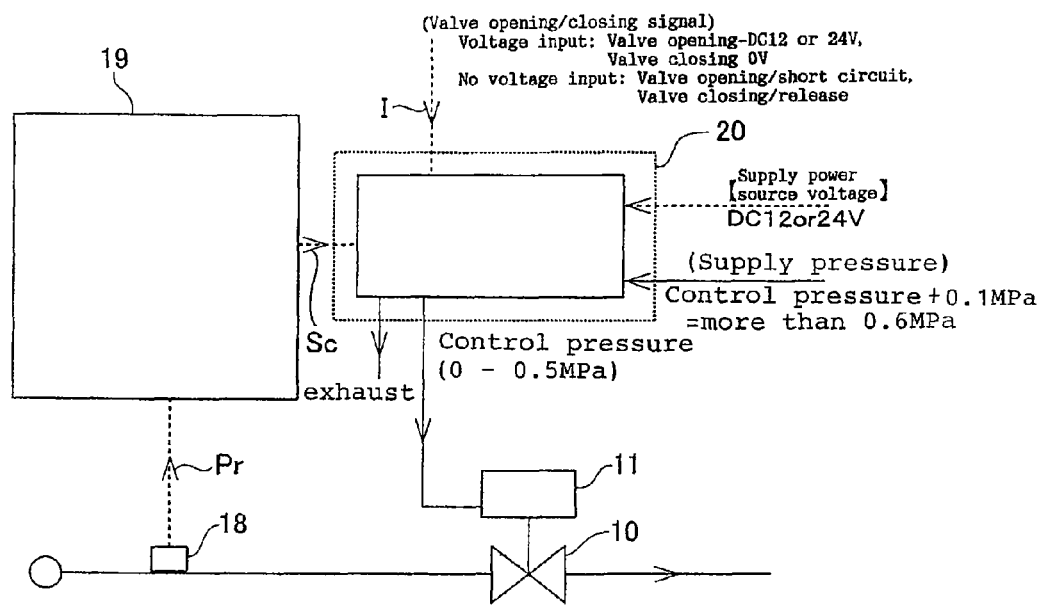
FIG. 17 is a whole system diagram schematically illustrating the water hammerless closing device in accordance with a third embodiment of the present invention.

FIG. 17 illustrates a third embodiment, in accordance with the present invention, for the method to close the fluid passage, and the water hammerless closing device used in the method. As shown in FIG. 17, another water hammerless closing device constructed, in accordance with the present invention, includes the pipe passage L1, the valve body 10, the air actuator 11, the vibration sensor 18, the tuning box 19, and the electro-pneumatic conversion device 20. The water hammerless closing device of the embodiment shown in FIG. 17 is nearly the same as that of the embodiment shown in FIG. 15.

However, in the embodiment shown in FIG. 17, there is the tuning box 19 to which the vibration detection signal Pr, from the vibration sensor 18 installed upstream of the valve body 10, is outputted as a feedback signal. Tuning box 19 detects the occurrence of a water hammer by using the feedback signal Pr and outputs the actuator operating pressure control signal Sc to the electro-pneumatic conversion device 20. Using this construction, another water hammerless closing device, for optimizing the 2-step actuator operating pressure Pa to be supplied to the air actuator 11, is provided. Specifically, as stated below, the optimal values of the step operating pressure Ps' of the actuator operating pressure Pa illustrated in FIG. 21, and the step operating pressure holding time t, are computed so that the control signal Sc for outputting such an actuator operating pressure Pa from the electro-pneumatic conversion device 20 to the actuator 11 is outputted to the electro-pneumatic conversion device 20.

Furthermore, the tuning box 19 is provided with a switch for switching over the control signal Sc, in accordance with the operation type (N.O., i.e. Normally Opened Type or N.C., i.e. Normally Closed Type), of the air actuator 11 of the valve body 10.

Figure 18:
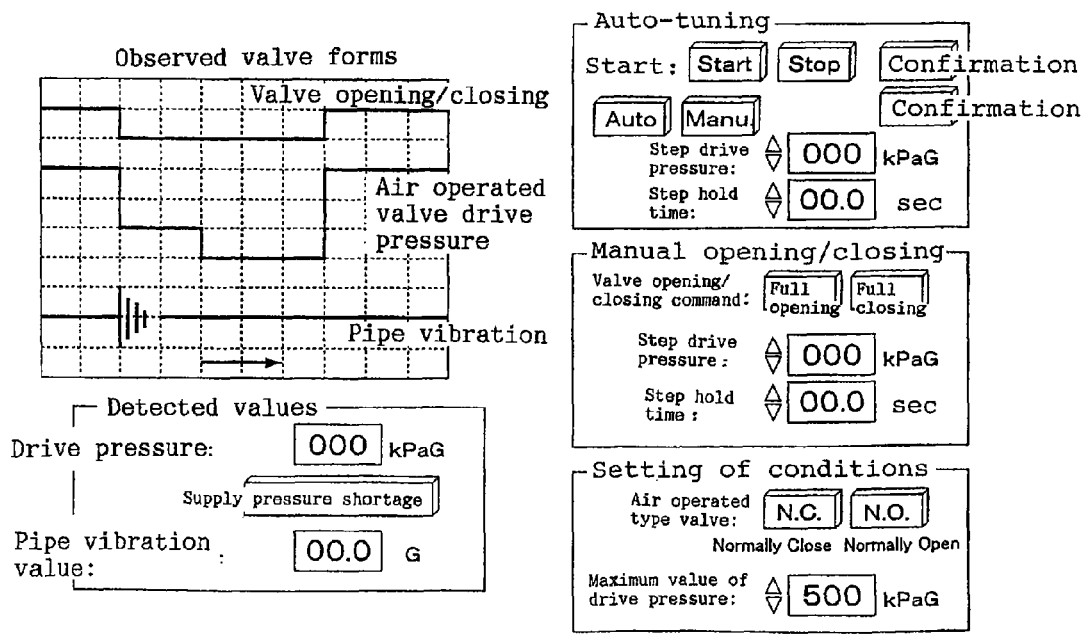
FIG. 18 is a schematic drawing of the PC screen display of a tuning box provided in accordance with certain embodiments of the present invention.

FIG. 18 illustrates an illustrative, non-limiting example of the screen display of a personal computer, which forms a major portion of the tuning box 19. Displayed on the screen of this personal computer are: (a) the state of opening/closing of the valve body 10, (b) the actuator operating pressure Pa to the air actuator 11, (c) the state of vibration of the pipe passage L1, (c) the step operating pressure Ps' and pipe vibration values, (d) the condition setting for auto-tuning, (e) the condition setting for manual opening/closing, (f) the operation type of the valve body 10, and the like.

Figure 19:
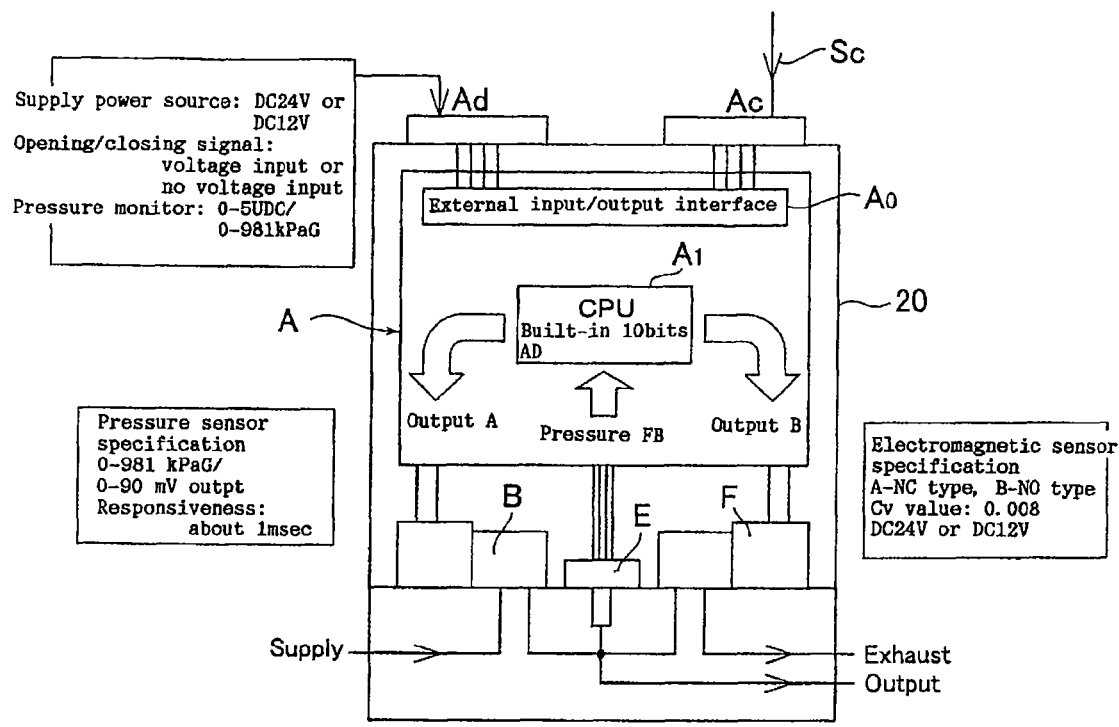
FIG. 19 is a block schematic diagram of an electro-pneumatic conversion device in accordance with the present invention.

The electro-pneumatic conversion device 20 of the water hammerless closing device of FIG. 17 is a combination of the signal converter and the electro-pneumatic converter, and includes, as shown in FIG. 19, (i) an air supply electromagnetic valve B, (ii) an air discharge electromagnetic valve F, (iii) a pressure sensor E, and (iv) a control circuit A. The conversion device 20 is almost the same as the one shown in FIGS. 2(*a*) and (*b*), at least with regard to the basic construction. For example, an air pressure not less than 0.6 MPa is supplied to the air supply electromagnetic valve B, and the air pressure of 0 to-0.5 MPa is outputted to the air actuator 11 as the actuator operating pressure control pressure Pa.

On the other hand, the control circuit A of the electro-pneumatic conversion device 20 is provided with a substrate A1, an external input/output interface Ao, and other components, and the external input/output interface Ao is provided with 2 connectors Ac and Ad. A supply power source (DC24 or 12V), an opening/closing signal I (voltage input or no-voltage input) and a pressure monitor (0~5 DCV·0~981 KpaG) are connected to the connector Ad while the tuning box 19 is connected to the connector Ac. Thus, connector Ac is connected to receive the control signal Sc.

Figure 20:
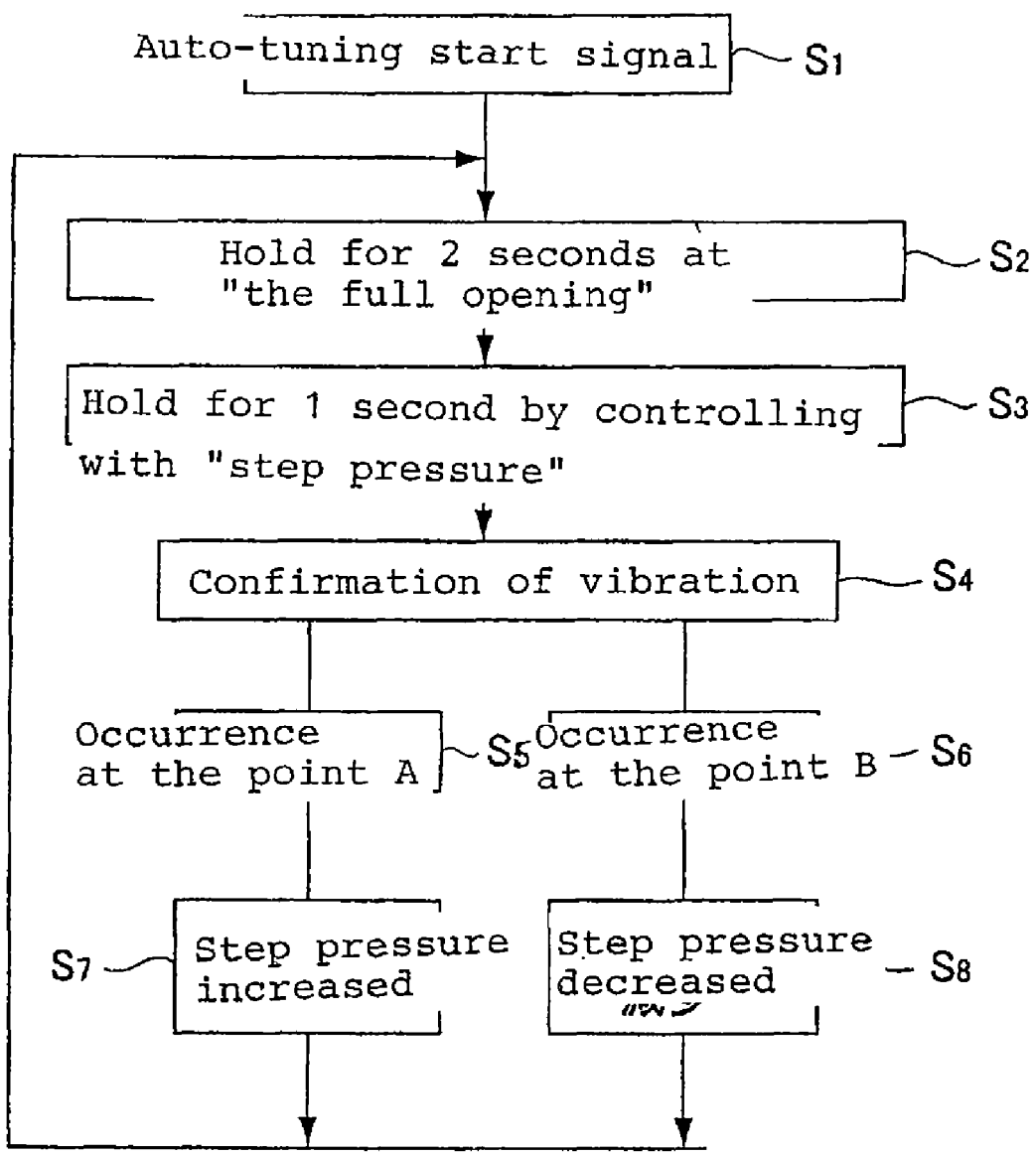
FIG. 20 is a flow chart of the auto-tuning operation employed in accordance with certain embodiments of the present invention.
Figure 21:
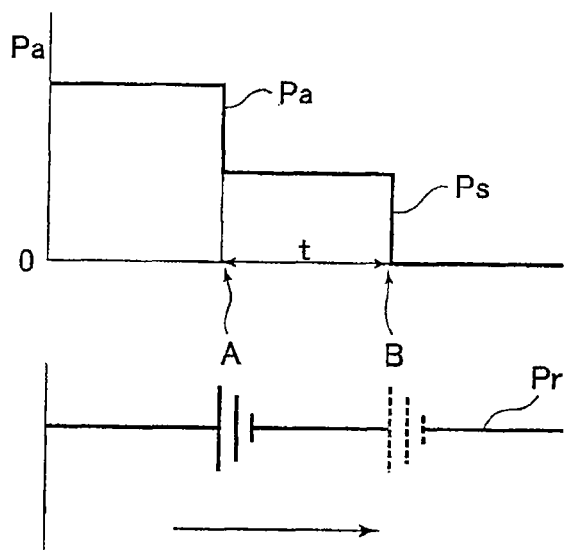
FIG. 21 provides an explanatory drawing to illustrate the relationship between the driving pressure Pa and generation of vibration in the auto-tuning operation.

FIG. 20 illustrates the performance flow of the steps of the auto-tuning method used by the water hammerless closing device shown in FIG. 17. FIG. 21 illustrates the relative relations between the actuator operating pressure Pa supplied to the air actuator 11 and the occurrence of vibration. As in the case illustrated by FIG. 16, a 2-step actuator operating pressure is applied as the actuator operating pressure Pa employed in the method outlined in FIG. 20.

Referring to FIG. 20 and to FIG. 17, the vibration sensor 18 is fixed at the predetermined position of the pipe passage L1 (i.e., within about 1000 mm upstream of the valve body 10, and preferably at the position of about 100 to 1000 mm upstream thereof), and the tuning box 19 and the electro-pneumatic conversion device 20 are set respectively.

Next, with the water hammerless closing device ready for operation, the auto-tuning start signal is inputted in Step S1. Then, in Step S2, the valve is kept in the state of full opening for about 2 seconds, and then, in Step S3, the 2-step actuator operating pressure Pa is applied for controlling the valve. In this case, the holding time t of the step operating pressure Ps' is set at 0.5-1 sec as will be stated later.

Vibration occurring in the pipe passage L1, due to the closing of the valve body 10, is detected and confirmed by the vibration detection signal Pr from the vibration sensor 18 in Step S4. Subsequently, the auto-tuning algorithm has a branch point where it is checked whether the vibration occurs at the point A, or the point B, in FIG. 21. Checking for vibration at point A is Step S5 and checking for vibration at point B is Step S6. In the event that vibration occurs at point A, the step operating pressure Ps' of the actuator operating pressure Pa is increased in Step S7. On the other hand, in the event that vibration occurs at point B, then the step operating pressure Ps' is decreased in Step S8.

Through the repetition (i.e., normally 2 or 3 times to 15 times) of the closing control of the valve body 10, the actuator operating pressure Pa having the most suitable step operating pressure Ps' for causing no vibration is eventually obtained. The control signal Sc outputting the 2-step actuator operating pressure Pa obtained by auto-tuning, and which is capable of the complete prevention of vibration during closing, is inputted to the electro-pneumatic device 20 for closing the valve body 10. Ins addition, the operating pressure holding time t, of the 2-step actuator operating pressure Pa to be supplied at the time of auto-tuning, is preferably as short as possible. When employing the pneumatic actuator 11, it is desirable to make time t shorter than 1 sec.

With reference to FIG. 20 and FIG. 21, the following comments are made assuming that a normally closed-type pneumatic diaphragm valve is used in the water hammerless closing device to close the valve body, which is placed in the opened state by supplying an actuator operating pressure Pa. In other words, it is possible to effect the water hammerless closing of a normally closed-type pneumatic diaphragm valve by decreasing the actuator operating pressure in two steps. It is, however, possible that a normally opened-type pneumatic diaphragm valve can be used to effect the water hammerless closing by raising the actuator operating pressure Pa in two steps. In this case, the step operating pressure Ps' of the actuator operating pressure Pa is adjusted oppositely to the case of the normally closed-type pneumatic diaphragm valve. That is, the step operating pressure Ps' is lowered if vibration occurs when the first step actuator operating pressure Pa rise is effected and the step operating pressure Ps' is raised if the vibration occurs when the second step actuator operating pressure Pa rise is effected.

Figure 22:
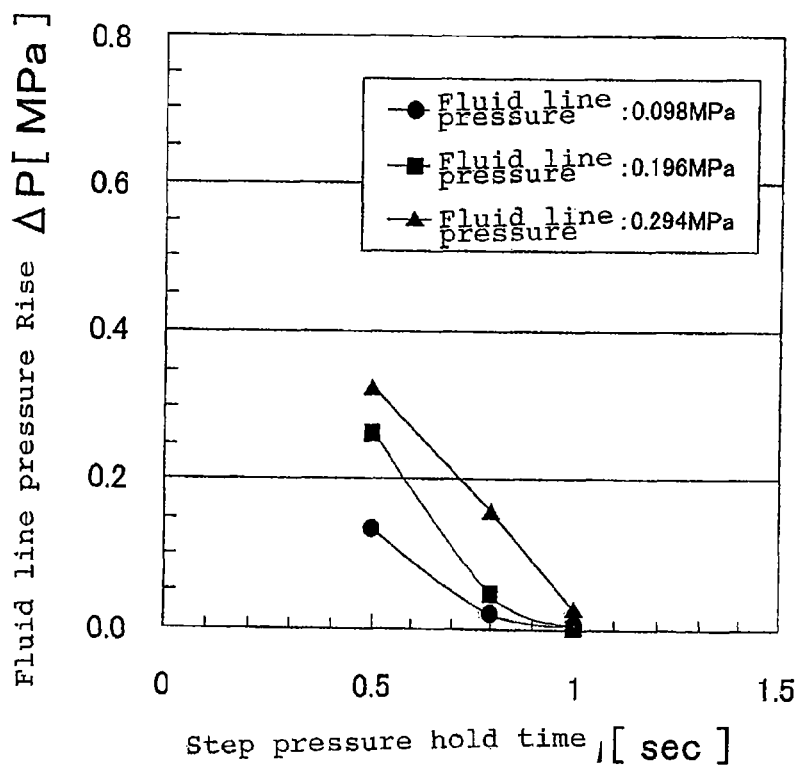
FIG. 22 is a diagram illustrating the relationship between the step pressure holding time t for the step-type driving pressure Pa and the pressure rise value ΔP.

FIG. 22 illustrates the relationship between the step operation holding time t and the pressure rise value ΔP (MPaG) of the fluid lines in which 3 types of pipe passages, with the fluid line pressures of 0.098 MPa, 0.198 MPa and 0.294 MPa, respectively, are closed using the 2-step operating pressure Pa of 0.490 MPaG-0.19 MPaG-0 MPaG with the pneumatic valve (19.05 mm) whose inner volume does not change at the valve opening/closing time. It is shown by FIG. 22 that the pressure rise ΔP can be brought to near-zero if the step operation holding time t exceeds 1 second, while the pressure rise ΔP will be great if the step operation holding time t is less than 0.5 second.

Thus, when the auto-tuning operation is completed and the control signal Sc capable of water-hammerless-closing the pipe passage L is obtained (that is, the control signal Sc for outputting the 2-step actuator operation pressure Pa for achieving water-hammerless-closing is obtained), the data on the control signal Sc (that is, corresponding to the operating pressure Pa) is transmitted to the electro-pneumatic conversion device 20 and is separately stored. Then, the auto-tuning box 19 and the vibration sensor 18 are removed from the water hammerless closing device. In the event that the rapid closure of the valve body 10 is required, the data on the control signal Sc, previously obtained in advance by auto-tuning, is utilized so that the 2-step actuator working pressure Pa capable of providing water hammerless closing is outputted from the electro-pneumatic conversion device 20 to the actuator 11 of the valve body 10.

In the embodiment shown in FIG. 17, when the auto-tuning operation is completed and the actuator operating pressure Pa (i.e., the step operating pressure Ps' and its holding time t) has been determined, the data on the operating pressure Pa is transmitted to the electro-pneumatic conversion device 20. Then, the vibration sensor 18 and the tuning box 19 are completely removed from the water hammerless closing device. However, it is within the scope of the present invention to construct the tuning box 19 so that it is made small in size and integrated with the electro-pneumatic conversion device 20. In this case, the tuning box 19 is not removed because it forms a portion of the integrated tuning box/electro-pneumatic conversion device structure.

Feasibility of Industrial Use

The present invention is applicable not only to the supply pipes for water, steam, liquid and the like for industrial use, but the present invention is also applicable to the supply pipes for household water/hot water, the supply pipes for fluids (liquids) used in the semiconductor manufacturing plants, chemical and other industrial plants and the like. In particular, the present invention is applicable to the chamber apparatus, and wafer cleaning devices, used in semiconductor manufacturing and in various types of etching devices.

Effects of the Invention

According to the present invention, in the event that the fluid pressure is constant, the valve body is moved to, and at once held at, a predetermined position for a short time in the initial valve opening operation by holding the driving force to the actuator at a set value, or by holding the valve stroke ΔG of the valve at a prescribed position, by adjusting the driving force to the actuator. Thereafter, the valve body is moved to a full closing position. As a result, the fluid passage can be safely closed in an extremely short of period time (for example, 300-1000 m sec) without causing a water hammer by setting the value of the afore-mentioned driving force, or the value of the valve stroke ΔG of the valve, within a suitable range.

Furthermore, in accordance with the present invention, in the event that the fluid pressure fluctuates, a method is employed in which (a) the valve stroke ΔG is an element to control, (b) the valve closing operation is halted for a short period of time when the valve stroke reaches the ΔG in the range previously set in advance, which causes no water hammer effect at the valve closing time, and then (c) the valve body is moved from the position having the valve stroke ΔG to the valve closing position (i.e., the valve stroke ΔG=0). As a result, the fluid passage is sure to be emergently-closed without causing a water hammer, regardless of the materials or structure of the valve body.

Furthermore, in accordance with the present invention, the valve is closed by the valve closing operation in which the valve stroke ΔG of the valve body is detected and fed back to the control circuit so that the valve stroke ΔG can reach a predetermined value, promptly and accurately, at the time when the valve body is closed. Subsequently, the valve is moved swiftly from the point of the set valve stroke ΔG to a full closing position. As a result of the operation of the structure described above, it is possible to close the fluid passage in an extremely short period of time without causing a Water hammer although the device is simple in the structure, thereby solving all the problems caused by the vibration pressure rise inside the fluid passage.

Also, in accordance with the present invention, the pressure detection value P1 detected by the pressure detection sensor PC and the closing time detection signal T detected by the closing time detection sensor TC of the valve body 10 are fed back to the computing/storage device 15 so that the stroke setting signal SG, to be inputted to the control circuit 13 of the water hammerless valve device, is controlled and brought to the optimum stroke setting signal in the set closing time. As a result, in the event that the passage internal pressure exceeds the allowable pressure rise value at the time when the passage is closed, the stroke setting signal SG is automatically modified to the optimum value, thus completely preventing an expected water hammer to be caused in the future by exceeding the allowable maximum pressure rise value at the time of closing of the fluid passage.

Furthermore, in accordance with the present invention, the vibration sensor 18 is removably attached to the pipe passage L1, and the vibration detection signal Pr detected by the vibration sensor 18 is fed back to the computing control device 16 so that the actuator operating pressure Pa applied to the actuator 11 of the valve body 10 is controlled through the electro-pneumatic conversion control device 17, thereby effecting the water hammerless closing method. As a result, water hammerless valve closing is achieved without the stroke position detection device being installed in the valve body 10, or without the pressure detector being installed in the pipe passage L1. Upon obtaining the conditions for the optimum water hammerless valve closing (that is, the conditions to control the actuator operating pressure Pa corresponding to water hammerless closing) for the targeted pipe passage L1, the vibration sensor 18 and the computing control device 16 can be removed and applied to another pipe passage, thus making the device economically advantageous.

Furthermore, in accordance with the present invention, the vibration sensor 18 is installed in the neighborhood of the valve body 10 in the pipe line passage which is put to actual operation, and the valve body 10 is actually operated for opening and closing by applying the predetermined 2-step actuator operating pressure Pa to the actuator 11 of the valve body 10 from the electro-pneumatic conversion device 20 so that the optimum value of the step operating pressure Ps' of the 2-step actuator operating pressure Pa is selected on the basis of the actual operation of the valve body 10. At the same time, the selected actuator operating pressure Pa is stored in the storage device of the electro-pneumatic conversion device 20. As a result, urgent closing of the valve body 10 can be achieved accurately and promptly by the employing actuator operating pressure Pa from the electro-pneumatic conversion device 20 without causing a water hammer in the fluid passage.

In addition, the selection and setting (i.e., tuning) of the afore-mentioned 2-step actuator operating pressure Pa can be completed with ease by actually operating the valve body 10 five or six times. Furthermore, the actuator operating pressure Pa having a suitable step operating pressure Ps' is applied to the actuator 11 so that the amplitude value of the pressure vibration can be brought to a value lower than the value for the first actual closing of the valve body 10. This makes it possible to accurately obtain the optimum value of the afore-mentioned actuator operating pressure Pa in advance, without adversely affecting the pipe passage.

Furthermore, by utilizing a personal computer, the selection and setting (tuning) of the afore-mentioned 2-step actuator operating pressure Pa can be effected promptly with extreme ease, and also the water hammerless closing device can be manufactured at low cost.

While the present invention has been described with reference to certain illustrative embodiments, one of ordinary skill in the art will recognize that additions, deletions, substitutions, modifications and improvements can be made while remaining within the spirit and scope of the present invention as defined by the appended claims.

The invention claimed is:

1. A method for closing a fluid passage with a nearly constant internal pressure in the passage, by using an actuator operated-type valve installed in the passage, wherein the method comprises the steps of:
    (a) detecting a vibration detecting signal Pr from vibration of the fluid passage caused by a change of internal pressure of the fluid passage;
    (b) first, moving a valve body from a fully opened state and in a valve closing direction to a partially opened state by increasing a driving input to an actuator to a predetermined value, wherein the driving input is increased to a first prescribed set value sufficient to prevent a water hammer in the fluid passage, wherein the first prescribed set value is a step pressure setting signal Ps wherein the vibration detecting signal Pr does not exceed a permissible upper limit vibration setting signal Prm;
    (c) maintaining the driving input to the actuator at the predetermined value for a short time; and then
    (d) further increasing the driving input so the valve body is brought from the partially opened state to a fully closed state to close the fluid passage without causing a water hammer, wherein the valve body is moved from the fully opened state to the fully closed state in a stepwise manner involving movement of the valve body from the fully opened state to the partially opened state and then from the partially opened state to the fully closed state, wherein the stepwise manner involves moving the valve body from the fully opened state to the fully closed state using only two, three, or four movements of the valve body.

2. A method as claimed in claim 1, wherein the short time is from about 300 msec to about 500 msec.

3. A method for closing a fluid passage as claimed in claim 1, wherein the valve body is a component of a normally opened-type pneumatic diaphragm valve, wherein the diaphragm valve is a fixed volume type valve, wherein an inner volume of the diaphragm valve is fixed and is not changed when the valve is operated.

4. A method for closing a fluid passage as claimed in claim 1, wherein the time needed to close the valve is set to be extremely short, and a rise value of the pressure of the fluid passage is permitted to be within 10% of a first pressure value occurring before the valve body is closed.

5. A method as claimed in claim 4, wherein the extremely short time for moving the valve to close from a fully opened state to the fully closed state is about 300 msec to about 1000 msec.

6. A method as claimed in claim 4, wherein the extremely short time to close the valve, from a fully opened state to a partially closed state corresponding to the valve stroke at the predetermined value, is about 100 msec to about 200 msec.

7. A method as claimed in claim 1, wherein the stepwise manner involves moving the valve body from the fully opened state to the fully closed state using only two movements of the valve body.

8. A method as claimed in claim 1, wherein the valve body moves from the fully opened state to the fully closed state in about 300 to 1000 msec.

9. A method for closing a fluid passage with a nearly constant internal pressure in the passage, by using an actuator operated-type valve installed in the passage, wherein the method comprises the steps of:
    (a) detecting a vibration detecting signal Pr from vibration of the fluid passage caused by a change of internal pressure of the fluid passage:
    (b) first, moving the valve body from a fully opened state and in a valve closing direction to a partially opened state by increasing a driving input to an actuator to bring a valve stroke close to a predetermined value, wherein the driving input is increased to a first prescribed set value sufficient to prevent a water hammer in the fluid passage, wherein the first prescribed set value is a step pressure setting signal Ps wherein the vibration detecting signal Pr does not exceed a permissible upper limit vibration setting signal Prm;
    (c) maintaining the valve stroke at the predetermined value for a short time; and then
    (d) further increasing the driving input to the actuator so the valve body is brought from the partially opened state to a fully closed state to close the fluid passage without causing a water hammer, wherein the valve body is moved from the fully opened state to the fully closed state in a stepwise manner involving movement of the valve body from the fully opened state to the partially opened state and then from the partially opened state to the fully closed state, wherein the stepwise manner involves moving the valve body from the fully opened state to the fully closed state using only two, three, or four movements of the valve body.

10. A method as claimed in claim 9, wherein the short time is from about 300 msec to about 500 msec.

11. A method as claimed in claim 9, wherein the stepwise manner involves moving the valve body from the fully opened state to the fully closed state using only two movements of the valve body.

12. A method for closing a fluid passage having a non-constant pipe passage internal pressure, by using an actuator operated-type valve installed in the fluid passage, wherein the method comprises the steps of:
    (a) detecting a vibration detecting signal Pr from vibration of the fluid passage caused by a change of internal pressure of the fluid passage;
    (b) first, moving a valve body from a fully opened state and in a valve closing direction to a partially opened state by increasing a driving input to an actuator to bring a valve stroke close to a predetermined value, wherein the driving input is increased to a first prescribed set value sufficient to prevent a water hammer in the fluid passage, wherein the first prescribed set value is a step pressure setting signal Ps wherein the vibration detecting signal Pr does not exceed a permissible upper limit vibration setting signal Prm;
(c) maintaining the valve stroke at the predetermined value for a short time; and then,
(d) further increasing the driving input to the actuator so the valve body is brought from the partially opened state to a fully closed state to close the fluid passage without causing a water hammer, wherein the valve body is moved from the fully opened state to the fully closed state in a stepwise manner involving movement of the valve body from the fully opened state to the partially opened state and then from the partially opened state to the fully closed state, wherein the stepwise manner involves moving the valve body from the fully opened state to the fully closed state using only two, three, or four movements of the valve body.

13. A method as claimed in claim 12, wherein the short time is from about 300 msec to about 500 msec.

14. A method as claimed in claim 12, wherein the stepwise manner involves moving the valve body from the fully opened state to the fully closed state using only two movements of the valve body.

15. A method for closing a fluid passage with a nearly constant internal pressure in the passage, by using an actuator operated-type valve installed in the passage, wherein the method comprises the steps of:
(a) detecting a vibration detecting signal Pr from vibration of the fluid passage caused by a change of internal pressure of the fluid passage;
(b) first, moving a valve body from a fully opened state and in a valve closing direction to a partially opened state by decreasing a driving input to an actuator to a predetermined value, wherein the driving input is decreased to a first prescribed set value sufficient to prevent a water hammer in the fluid passage, wherein the first prescribed set value is a step pressure setting signal Ps wherein the vibration detecting signal Pr does not exceed a permissible upper limit vibration setting signal Prm;
(c) maintaining the driving input to the actuator at the predetermined value for a short time; and then
(d) further decreasing the driving input so the valve body is brought from the partially opened state to a fully closed state to close the fluid passage without causing a water hammer, wherein the valve body is rapidly moved from the fully opened state to the fully closed state in a stepwise manner involving movement of the valve body from the fully opened state to the partially opened state and then from the partially opened state to the fully closed state, wherein the stepwise manner involves rapidly moving the valve body from the fully opened state to the fully closed state using only two, three, or four movements of the valve body.

16. A method as claimed in claim 15, wherein the stepwise manner involves moving the valve body from the fully opened state to the fully closed state using only two movements of the valve body.

17. A method as claimed in claim 15, wherein the valve body moves from the fully opened state to the fully closed state in about 300 to 1000 msec.

18. A method for closing a fluid passage with a nearly constant internal pressure in the passage, by using an actuator operated-type valve installed in the passage, wherein the method comprises the steps of:
(a) detecting a vibration detecting signal Pr from vibration of the fluid passage caused by a change of internal pressure of the fluid passage;
(b) first, moving the valve body from a fully opened state and in a valve closing direction to a partially opened state by decreasing a driving input to an actuator to bring a valve stroke close to a predetermined value, wherein the driving input is decreased to a first prescribed set value sufficient to prevent a water hammer in the fluid passage, wherein the first prescribed set value is a step pressure setting signal Ps wherein the vibration detecting signal Pr does not exceed a permissible upper limit vibration setting signal Prm;
(c) maintaining the valve stroke at the predetermined value for a short time; and then
(d) further decreasing the driving input to the actuator so the valve body is brought from the partially opened state to a fully closed state to close the fluid passage without causing a water hammer, wherein the valve body is moved from the fully opened state to the fully closed state in a stepwise manner involving movement of the valve body from the fully opened state to the partially opened state and then from the partially opened state to the fully closed state, wherein the stepwise manner involves moving the valve body from the fully opened state to the fully closed state using only two, three, or four movements of the valve body.

19. A method as claimed in claim 18, wherein the stepwise manner involves moving the valve body from the fully opened state to the fully closed state using only two movements of the valve body.

20. A method for closing a fluid passage having a non-constant pipe passage internal pressure, by using an actuator operated-type valve installed in the fluid passage, wherein the method comprises the steps of:
(a) detecting a vibration detecting signal Pr from vibration of the fluid passage caused by a change of internal pressure of the fluid passage;
(b) first, moving a valve body from a fully opened state and in a valve closing direction to a partially opened state by decreasing a driving input to an actuator to bring a valve stroke close to a predetermined value, wherein the driving input is decreased to a first prescribed set value sufficient to prevent a water hammer in the fluid passage, wherein the first prescribed set value is a step pressure setting signal Ps wherein the vibration detecting signal Pr does not exceed a permissible upper limit vibration setting signal Prm;
(c) maintaining the valve stroke at the predetermined value for a short time; and then,
(d) further decreasing the driving input to the actuator so the valve body is brought from the partially opened state to a fully closed state to close the fluid passage without causing a water hammer, wherein the valve body is moved from the fully opened state to the fully closed state in a stepwise manner involving movement of the valve body from the fully opened state to the partially opened state and then from the partially opened state to the fully closed state, wherein the stepwise manner involves moving the valve body from the fully opened state to the fully closed state using only two, three, or four movements of the valve body.

21. A method as claimed in claim 20, wherein the stepwise manner involves moving the valve body from the fully opened state to the fully closed state using only two movements of the valve body.

* * * * *